(12) United States Patent
Takezawa

(10) Patent No.: US 8,287,135 B2
(45) Date of Patent: Oct. 16, 2012

(54) LIGHT SOURCE DEVICE AND PROJECTOR WITH IMPROVED AIRFLOW

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 12/717,456

(22) Filed: Mar. 4, 2010

(65) Prior Publication Data

US 2010/0231867 A1 Sep. 16, 2010

(30) Foreign Application Priority Data

Mar. 11, 2009 (JP) .................................. 2009-057512

(51) Int. Cl.
G03B 21/18 (2006.01)
(52) U.S. Cl. ................................ 353/61; 353/57; 353/60
(58) Field of Classification Search .................... 353/52, 353/57, 58, 60, 61, 99; 313/35, 623
See application file for complete search history.

(56) References Cited

U.S. PATENT DOCUMENTS 6,177,131 B1 * 1/2001 Glaubitt et al. ............... 427/162
6,527,417 B2 * 3/2003 Basey ........................... 362/264

FOREIGN PATENT DOCUMENTS

JP A-2008-216727 9/2008
JP A-2008-218127 9/2008

* cited by examiner

*Primary Examiner* — Thanh Luu
*Assistant Examiner* — Renee Naphas
(74) *Attorney, Agent, or Firm* — Oliff & Berridge, PLC

(57) ABSTRACT

A light source device, includes: an arc tube which has a light emission portion containing a pair of electrodes disposed along an illumination axis, and a pair of sealing portions extending from both sides of the light emission portion; a reflector which has a reflection portion disposed in the vicinity of one of the sealing portions (the one sealing portion) of the arc tube for reflecting light emitted from the arc tube toward an illumination area; and a rectifying portion disposed between the light emission portion and the reflector for regulating a flow direction of cooling air and transmitting the light from the arc tube.

20 Claims, 9 Drawing Sheets

LIGHT SOURCE DEVICE AND PROJECTOR WITH IMPROVED AIRFLOW

BACKGROUND

1. Technical Field

The present invention relates to a light source device and a projector including the light source device.

2. Related Art

A projector which forms a light image by modulating light emitted from a light source device and projects the formed light image on a screen or the like is known. The light source device contained in the projector includes an arc tube and a reflector for reflecting light emitted from the arc tube. The arc tube has a light emission portion containing a pair of electrodes, and sealing portions extending from both sides of the light emission portion. A type of the light source device included in the projector has a sub mirror on the arc tube to use light emitted from the arc tube with high efficiency. According to this type of light source device, heat generated by light emission needs to be cooled so as to adjust the temperature of the arc tube to an appropriate temperature.

FIG. 9 is a cross-sectional view illustrating the side of a light source unit including a light source device in related art. As described above, a light source device 69 in the related art includes an arc tube having a light emission portion 81 and sealing portions 82 and 83, a reflector 70, a sub mirror 90 and other parts. A light source unit 8 includes the light source device 69, a concave lens 11 for collimating light emitted from the light source device 69, a housing 9 for accommodating the light source device 69 and the concave lens 11, and other components. The housing 9 has an air intake port 9a through which cooling air W is introduced, and an air discharge port 9b through which the cooling air W flowing within the housing 9 is discharged from the housing 9. Furthermore, a cooling fan 511 for delivering the cooling air W, a duct 521 for guiding the cooling air W toward the air intake port 9a, a louver 531 for controlling the flowing direction of the cooling air W to be introduced from the air intake port 9a into the housing 9, and others are provided outside the light source unit 8 (inside the projector including the light source unit 8). Heat generated by light emission from the arc tube 80 is cooled by the light source unit 8, the cooling fan 511 and others.

According to a technology disclosed in JP-A-2008-216727, a rectifying portion is disposed around the sealing portions of the light source device described above at a position out of the effective optical path particularly for preventing excessive increase in the temperature of the upper area of the arc tube by cooling the light emission portion with high efficiency.

However, when cooling air is supplied to the light source unit 8 in the related art to cool the heat generated by the arc tube 80 of the light source device 69, the cooling air W tends to flow along the inner surface of the reflector 70 (a reflection layer 73) as indicated by arrows in FIG. 9. In this case, the speed of airflow between the light emission portion 81 and the reflector 70 (the reflection layer 73) in the direction of an illumination axis L increases. As a result, the flow of the introduced cooling air W to an area A in the upper region of the light emission portion 81 as an area having a high temperature due to heat convection is limited, and thus the area A cannot be efficiently cooled. When the airflow amount or the airflow speed of the cooling fan 511 is raised so as to adjust the temperature of the area A in the upper region of the light emission portion 81 having the high temperature to an appropriate temperature, an area B on the reflector 70 side of the light emission portion 81 is excessively cooled. In this case, the temperature difference in the temperature distribution in the direction of the illumination axis L increases. Particularly, in case of the light source device including the sub mirror 90 and thus having a relatively larger distance between the light emission portion 81 and the reflector 70 in the direction of the illumination axis L than the distance of a light source device not including the sub mirror 90, the temperature difference becomes more remarkable.

When the excessively cooled condition continues in the area B, the inner wall in the area B of the light emission portion 81 is blackened. When the air supply is decreased so as to prevent excessive cooling in the area B, the temperature of the area A is raised to a high temperature. As a result, the inner wall in the area A of the light emission portion 81 is easily whitened. The blackening refers to a phenomenon where evaporated atoms of a base material constituting an electrode (such as tungsten atoms) do not return to the electrode but adhere to the inner wall of the light emission portion 81 when a halogen cycle of the base material is not normally performed due to the low temperature. The whitening herein refers to a phenomenon which whitens a base material constituting the light emission portion 81 at the time of recrystallization of the base material caused by the high temperature. When the whitening or blackening is produced, the area corresponding to the whitening or blackening loses transparency in either of the cases and lowers the amount of light emitted from the light source device 69.

Therefore, such a light source device and a projector have been demanded which can efficiently cool generated heat, properly control the temperatures of the upper area of the light emission portion and the reflector side of the light emission portion, reduce the temperature difference on the light emission portion, and obtain uniform temperature distribution in the direction of the illumination axis.

SUMMARY

It is an advantage of some aspects of the invention to provide a technology for solving at least a part of the problems described above.

First Aspect

A first aspect of the invention is directed to a light source device which includes: (a) an arc tube which has a light emission portion containing a pair of electrodes disposed along an illumination axis, and a pair of sealing portions extending from both sides of the light emission portion; (b) a reflector which has a reflection portion disposed in the vicinity of one of the sealing portions (the one sealing portion) of the arc tube for reflecting light emitted from the arc tube toward an illumination area; and (c) a rectifying portion disposed between the light emission portion and the reflector for regulating a flow direction of cooling air and transmitting the light from the arc tube.

According to the light source device having this structure, cooling air introduced by the rectifying portion disposed between the light emission portion and the reflector to flow along the reflection portion of the reflector flows along the rectifying portion by the function of the rectifying portion for regulating the flow direction. Since the rectifying portion transmits light emitted from the arc tube and further transmits light reflected by the reflection portion, the light amount from the light source device becomes similar to that from a light source device in related art. In this case, the cooling air easily flows to the upper area of the light emission portion as an area having high temperature, and thus efficiently cools the heat in the upper area of the light emission portion as the area having high temperature. Moreover, even when air is supplied to adjust the temperature of the upper area of the light emission portion to an appropriate temperature, the reflector side of the light emission portion is not excessively cooled. Thus, the upper area of the light emission portion can be efficiently cooled, and the temperatures of the upper area of the light emission portion and the reflector side of the light emission portion can be properly controlled such that the temperature difference between these areas can be reduced. Accordingly, the light source device having uniform temperature distribution in the direction of the illumination axis can be produced.

Second Aspect

A second aspect of the invention is directed to the light source device of the above aspect which further includes a sub mirror disposed in the vicinity of the other sealing portion in such a manner as to cover the outer surface of the light emission portion as the surface facing the illumination area to reflect the light from the arc tube toward the arc tube.

According to the light source device of this aspect including the sub mirror, the temperature of the upper area of the light emission portion increases higher than that of a light source device having no sub mirror. However, the upper area of the light emission portion can be efficiently cooled by the rectifying portion. Moreover, the temperatures of the upper area of the light emission portion and the reflector side of the light emission portion can be properly controlled. Thus, the temperature difference in the temperature distribution of the light source device can be reduced.

Third Aspect

A third aspect of the invention is directed to the light source device of the above aspects, wherein the rectifying portion is fixed to at least either the one sealing portion or the reflector.

According to the light source device of this aspect, the rectifying portion is fixed to at least either the one sealing portion or the reflector. Thus, the rectifying portion can be operated in a stable manner without affected by the effect of flow of the cooling air.

Fourth Aspect

A fourth aspect of the invention is directed to the light source device of the above aspects which further includes a support portion which supports the rectifying portion in the vicinity of the one sealing portion and fixes the rectifying portion to a position around the one sealing portion.

According to the light source device of this aspect, the rectifying portion is securely fixed to the one sealing portion in a proper position with respect to the reflection portion of the reflector and the arc tube. Moreover, the rectifying portion plate can be operated in a stable manner without affected by the effect of flow of the cooling air.

Fifth Aspect

A fifth aspect of the invention is directed to the light source device of the above aspects, wherein the support portion holds the rectifying portion between the support portion and the light emission portion and fixes the rectifying portion.

According to the light source device of this aspect, the support portion holds the rectifying portion between the support portion and the light emission portion and fixes the rectifying portion. Thus, the rectifying portion can be securely fixed and operated in a stable manner without affected by the effect of flow of the cooling air. Moreover, the effect of thermal stress on the one sealing portion can be reduced by avoiding direct fixture of the rectifying portion to the one sealing portion.

Sixth Aspect

A sixth aspect of the invention is directed to the light source device of the above aspects, wherein a notch is formed on the edge of the rectifying portion.

According to the light source device of this aspect, the cooling air is introduced to an area surrounded by the reflector and the rectifying portion through the notch formed on the edge of the rectifying portion. Thus, the heat within the area can be appropriately cooled.

Seventh Aspect

A seventh aspect of the invention is directed to the light source device of the above aspects, wherein: when an adhesive is used for fixing the rectifying portion to the one sealing portion, the adhesive fixes the rectifying portion to a position corresponding to an area out of an electrode connection region of the one sealing portion.

According to the light source device of this aspect, the adhesive is applied to the position corresponding to the area out of the electrode connection region of the one sealing portion. Thus, the effect on the one sealing portion caused by thermal stress can be reduced by avoiding application of the adhesive to the electrode connection region easily affected by thermal stress.

The electrode connection region herein refers to an area where lines contained in the electrode are connected by welding or the like with a metal foil or the like sealed within the sealing portion. The area out of the electrode connection region refers to an area not corresponding to the electrode connection region.

Eighth Aspect

An eighth aspect of the invention is directed to the light source device of the above aspects, wherein the rectifying portion is disposed in such a position as to be substantially orthogonal to the illumination axis.

According to the light source device of this aspect, the rectifying portion is disposed substantially orthogonal to the illumination axis. Thus, even when the condition of the light source device is switched from the normal condition to the suspension condition to use the light source device upside down, the difference between the position of the rectifying portion in the upside-down condition and that position in the normal condition is small. Accordingly, advantages similar to those provided in the normal condition can be offered in the upside-down condition.

Ninth Aspect

A ninth aspect of the invention is directed to the light source device of the above aspects, wherein the rectifying portion has a flat surface or a curved surface through which the light can be transmitted.

According to the light source device of this aspect, the rectifying portion has a flat surface or a curved surface. Thus, highly efficient surfaces of the rectifying portion suited for the respective shapes of the arc tube, the reflector and the like included in the light source device and for the respective ways of flow of the cooling air can be selected with a higher degree of freedom.

Tenth Aspect

A tenth aspect of the invention is directed to the light source device of the above aspects, wherein the rectifying portion has a substantially circular or substantially rectangular flat shape.

According to the light source device of this aspect, the shape of the rectifying portion can be matched with the inner surface shape of the reflection portion when the flat surface shape of the rectifying portion is substantially circular. In this case, the flow of the cooling air can be securely regulated. When the flat surface shape is substantially rectangular, a clearance is produced by the difference between the inner surface shape of the reflection portion and the rectangular shape of the rectifying portion. Thus, the cooling air can be introduced into the area surrounded by the reflection portion and the rectifying portion through the clearance.

Eleventh Aspect

An eleventh aspect of the invention is directed to the light source device of the above aspects, wherein anti-reflection processing is applied to the surface of the rectifying portion.

According to the light source device of this aspect, anti-refection processing is applied to the surface of the rectifying portion. Thus, light emitted from the light emission portion and light reflected by the reflection portion are prevented from being changed in their optical paths due to reflection by the rectifying portion when the lights are passing through the rectifying portion. Accordingly, the efficiency of extracting the light emitted from the light emission portion to the outside of the light source device can be improved.

Twelfth Aspect

A twelfth aspect of the invention is directed to a projector which includes; the light source device of any aspects described above; and an optical modulation device which forms an optical image by modulating light emitted from the light source device according to an image signal.

The projector of this aspect of the invention includes the light source device of any aspects. In this case, the projector can efficiently cool the upper area of the light emission portion, and properly control the temperatures of the upper area of the light emission portion and the reflector side of the light emission portion such that the temperature difference between these areas can be reduced. Thus, the temperature distribution in the direction of the illumination axis becomes uniform, and whitening and blackening of the light emission portion can be reduced. Accordingly, the life of the light source device included in the projector can be increased.

BRIEF DESCRIPTION OF THE DRAWINGS

The invention will be described with reference to the accompanying drawings, wherein like numbers reference like elements.

FIGS. 2A and 2B illustrate a light source unit, wherein FIG. 2A is a cross-sectional view showing the side of the light source unit; and FIG. 2B is a front view showing a connecting area between a light emission portion and one of sealing portions as viewed from the reflector side, the connecting area containing a condition cut along a plane orthogonal to an illumination axis.

FIGS. 3A and 3B illustrate a light source unit according to a second embodiment, wherein FIG. 3A is a cross-sectional view showing the side of the light source unit; and FIG. 3B is a front view showing a connecting area between a light emission portion and one of sealing portions as viewed from the reflector side, the connecting area containing a condition cut along a plane orthogonal to an illumination axis.

DESCRIPTION OF EXEMPLARY EMBODIMENTS

The exemplary embodiments according to the invention are hereinafter described with reference to the drawings.

First Embodiment

Figure 1:
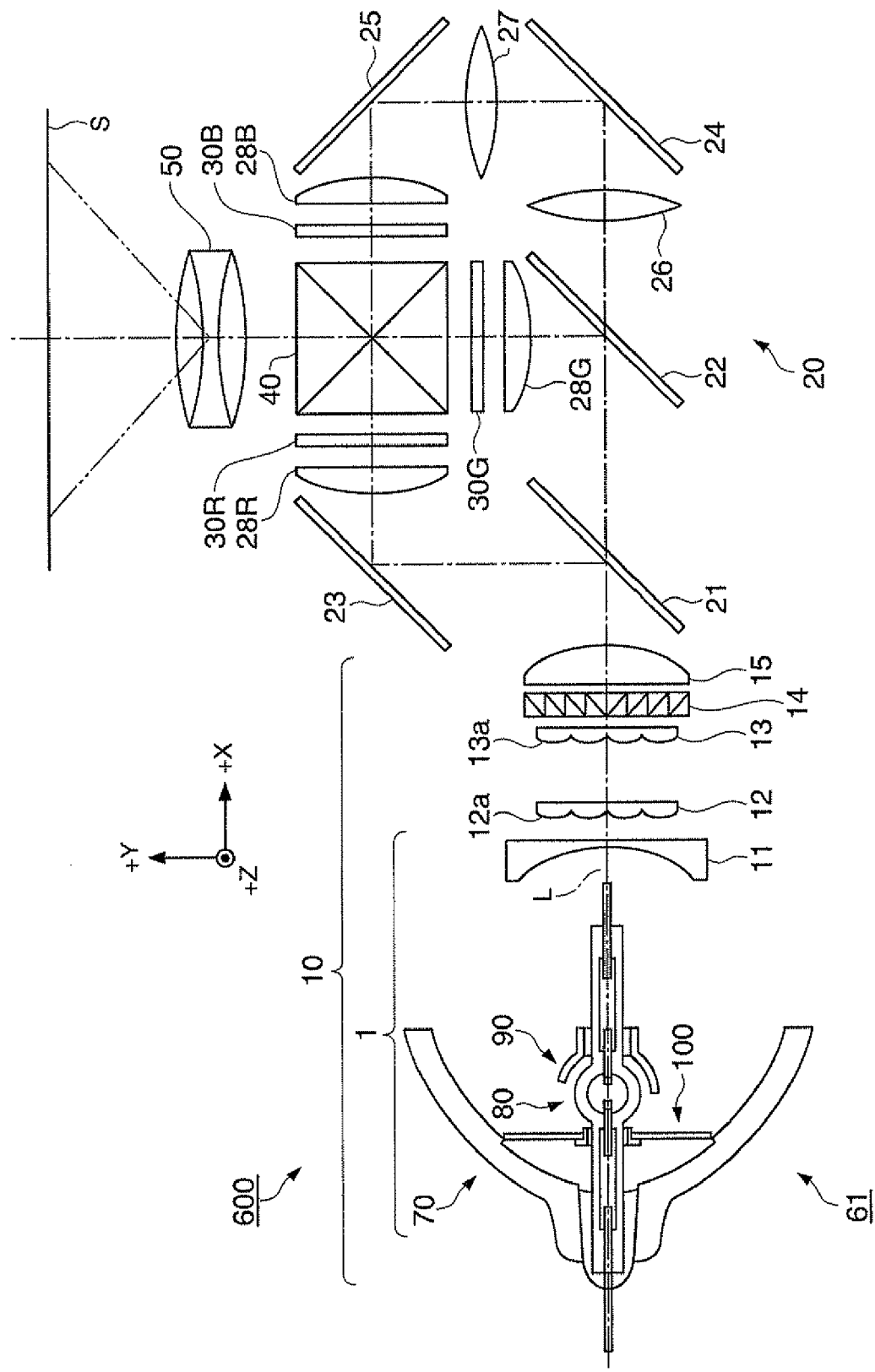
FIG. 1 illustrates optical systems of a projector according to a first embodiment.

FIG. 1 illustrates optical systems of a projector according to a first embodiment. The structure and operation of the optical systems of a projector 600 are now explained with reference to FIG. 1.

In the figures for explaining this embodiment (FIG. 1 and FIGS. 2A and 2B referred to in the following description), an XYZ orthogonal coordinate system is used which indicates an X axis direction as a direction of an illumination axis L of light emitted from a light source device 61 toward an illumination area, a Y axis direction as a direction orthogonal to the X axis direction and in parallel with the sheet surface of FIG. 1, and a Z axis direction as a direction orthogonal to the X axis direction and perpendicular to the sheet surface of FIG. 1. In this case, the light traveling direction corresponds to the +X direction, the left direction with respect to the +X direction corresponds to the +Y direction, and the upper direction with respect to the +X direction corresponds to the +Z direction.

The projector 600 according to this embodiment has optical systems. The optical systems form an optical image by modulating light emitted from the light source device 61 according to image signals, and project a projection image to a projection target surface such as a screen S through a projection system 50.

As illustrated in FIG. 1, the optical systems of the projector 600 include an integrator illumination system 10, a color separation and light guide system 20, an optical modulation device, a color combining system, and the projection system 50. The integrator illumination system 10 is an optical system for equalizing illuminance of light emitted from the light source device 61 within a plane orthogonal to the illumination axis L. The color separation and light guide system 20 separates illumination light received from the integrator illumination system 10 into three color lights in red (R), green (G), and blue (B), and guides the divided color lights to the illumination area.

The optical modulation device is an optical system which modulates each of the three color lights separated by the color separation and light guide system 20 according to image signals, and includes three liquid crystal devices 30R, 30G, and 30B corresponding to the three color lights in red (R), green (G), and blue (B). The color combining system combines optical images modulated by the optical modulation device (the three liquid crystal devices 30R, 30G, and 30B), and includes a cross dichroic prism 40. The projection system 50 is an optical system which projects an optical image produced by combining the optical images in the respective colors using the color combining system (the cross dichroic prism 40) to the projection target surface such as the screen S.

The integrator illumination system 10 includes the light source device 61 for emitting illumination light toward the illumination area, a concave lens 11 for releasing converged light emitted from the light source device 61 as substantially parallel light, and a first lens array 12 having a plurality of first small lenses 12a for dividing the illumination light released from the concave lens 11 into a plurality of partial lights.

The integrator illumination system 10 further includes a second lens array 13 having a plurality of second small lenses 13a corresponding to the plural first small lenses 12a of the first lens array 12, a polarization converting element 14 which converts the partial lights released from the second lens array 13 into substantially one type of linear polarized lights having the same polarization direction and releases the converted lights, and a stacking lens 15 for stacking the respective partial lights released from the polarization converting element 14 on the illumination area.

As illustrated in FIG. 1 (and FIGS. 2A and 2B as well), the light source device 61 includes a reflector 70, an arc tube 80 having the light emission center in the vicinity of a first focus of the reflector 70, a sub mirror 90 for reflecting light emitted from a light emission portion 81, and a rectifying portion 100 for regulating the flow direction of cooling air W1. The light source device 61 emits light having the illumination axis L as the center axis.

The details of the structure and operation of the light source device 61 will be described after the explanation of the optical systems of the projector 600.

As illustrated in FIG. 1, the concave lens 11 is disposed on the illumination area of the reflector 70. The concave lens 11 is so designed as to direct the light from the reflector 70 toward the first lens array 12.

The first lens array 12 functions as a light dividing optical element for dividing light from the concave lens 11 into plural partial lights, and has the plural first small lenses 12a disposed in matrix having plural lines and plural rows within a plane orthogonal to the illumination axis L. Each external shape of the first small lenses 12a is similar to each external shape of the image forming areas of the liquid crystal devices 30R, 30G, and 30B.

The second lens array 13 forms respective images of the first small lenses 12a of the first lens array 12 in the vicinity of the image forming areas of the liquid crystal devices 30R, 30G, and 303 in cooperation with the stacking lens 15. The second lens array 13 has a structure substantially similar to that of the first lens array 12, containing the plural second small lenses 13a disposed in matrix having plural lines and plural rows within a plane orthogonal to the illumination axis L.

The polarization converting element 14 is a polarizing element which converts the respective partial lights divided by the first lens array 12 into substantially one type of linear polarized lights having the same polarization direction and releases the converted lights. The polarization converting element 14 has a polarization dividing layer which transmits one of the linear polarized light components of the polarized light components contained in the light emitted from the light source device 61 and reflects the other linear polarized light component in a direction perpendicular to the illumination axis L, a reflection layer which reflects the other linear polarized light component reflected by the polarization dividing layer in a direction parallel with the illumination axis L, and a retardation film which converts the one linear polarized light component transmitted by the polarization dividing layer into the other linear polarized light component.

The stacking lens 15 is an optical element which collects the plural partial lights having passed the first lens array 12, the second lens array 13, and the polarization converting element 14 and stacks the collected partial lights in the vicinity of the image forming areas of the liquid crystal devices 30R, 30G, and 30B. The stacking lens 15 is disposed in such a position that the optical axis of the stacking lens 15 almost coincides with the illumination axis L of the integrator illumination system 10. The stacking lens 15 may be a compound lens produced by combining plural lenses.

The color separation and light guide system 20 has dichroic mirrors 21 and 22, reflection mirrors 23, 24, and 25, an entrance side lens 26, a relay lens 27, and converging lenses 28R, 28G, and 28B. The color separation and light guide system 20 separates the illumination light released from the stacking lens 15 into three color lights of red light, green light, and blue light, and guides the respective color lights to the three liquid crystal devices 30R, 30G, and 30B as the illumination targets.

The liquid crystal devices 30R, 30G, and 30B which modulate illumination lights according to image signals are the illumination targets of the integrator illumination system 10. Each of the liquid crystal devices 30R, 30G, and 30B has liquid crystals as electro-optic substances sealed between a pair of transparent glass base materials, and modulates the polarization direction of the one type of the linear polarized lights released from entrance side polarization plates described later according to inputted image signals by using polysilicon TFT as switching elements, for example.

The converging lenses 28R, 28G, and 28B for controlling the incident angles are disposed on the optical path before the liquid crystal devices 30R, 30G, and 30B. Though not shown in the figure, the entrance side polarization plates are interposed between the converging lens 28R and the liquid crystal device 30R, between the converging lens 28G and the liquid crystal device 30G, and between the converging lens 28B and the liquid crystal device 30B, and exit side polarization plates are interposed between the liquid crystal device 30R and the cross dichroic prism 40, between the liquid crystal device 30G and the cross dichroic prism 40, and between the liquid crystal device 30B and the cross dichroic prism 40. The respective entering color lights are modulated by the entrance side polarization plates, the liquid crystal devices 30R, 30G, and 30B, and the exit side polarization plates.

The cross dichroic prism 40 is an optical device which combines the optical images emitted from the exit side polarization plates and modulated for each color light into a color image. The cross dichroic prism 40 has a substantially square shape in the plan view produced by affixing four rectangular prisms, and dielectric multilayer films are provided on the interfaces of the rectangular prisms affixed to one another in an approximately X shape. The dielectric multilayer film formed on one of the interfaces in the substantially X shape reflects the red light, and the dielectric multilayer film formed on the other interface reflects the blue light. The red light and the blue light are bent by the dielectric multilayer films in the same direction as the traveling direction of the green light such that the three color lights can be combined.

The color image released from the cross dichroic prism 40 is expanded and projected by the projection system 50 to form a projection image on the screen S as the projection target surface.

Figures 2A, 2B:
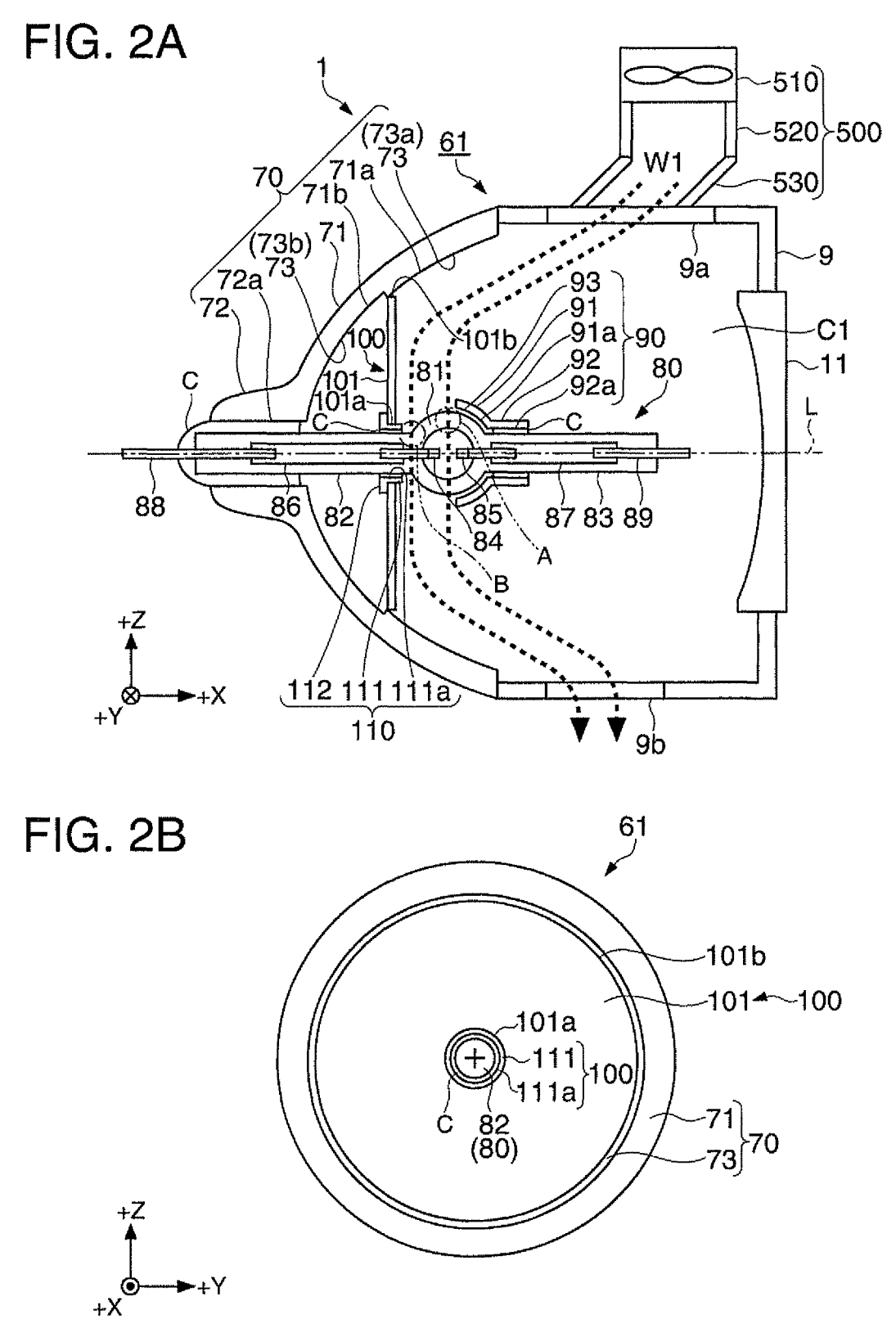

FIGS. 2A and 2B illustrate a light source unit. FIG. 2A is a cross-sectional view showing the side of the light source unit. FIG. 2B is a front view showing a connecting area between the light emission portion and one of the sealing portions as viewed from the reflector side, the connecting area containing a condition cut along a plane orthogonal to the illumination axis. The structure and operation of a light source unit 1 are now described with reference to FIGS. 2A and 2B.

The light source unit 1 in this embodiment includes the light source device 61, the concave lens 11, and the housing 9 for accommodating the light source device 61 and the concave lens 11. A cooling mechanism 500 for cooling heat generated by the light source device 61 is further provided in such a position as to face the light source unit 1 when the light source unit 1 is accommodated at a predetermined position inside the projector 600.

As illustrated in FIG. 2A, the light source device 61 includes the reflector 70, the arc tube 80 having the light emission center in the vicinity of the first focus of the reflector 70, and the sub mirror 90 for reflecting light emitted from the light emission portion 81, and the rectifying portion 100 for regulating the flow direction of the cooling air W1 introduced into the light source device 61. The light source device 61 emits light having the illumination axis L as the center axis.

The reflector 70 includes a reflector main body 71 having ellipsoidal concave surfaces 71a and 71b, and a cylindrical portion 72 through which an end of a sealing portion (one of sealing portions) 82 of the arc tube 80 described later is inserted to be fixed to the cylindrical portion 72. The reflector main body 71 and the cylindrical portion 72 constituting the reflector 70 are formed integrally with each other. A reflection layer 73 (73a and 73b) having high reflectance are provided on the concave surfaces 71a and 71b of the reflector main body 71. The details of the concave surfaces 71a and 71b and the reflection layer 73 (73a and 73b) corresponding to the concave surfaces 71a and 71b will be described later.

The cylindrical portion 72 is a cylindrical body provided on the surface opposite to the reflection layer 73 in such a manner as to extend from the centers of the reflection layer 73 and the reflector main body 71. An opening 72a is formed inside the cylindrical portion 72 such that the end of the sealing portion 82 of the arc tube 80 described later can be inserted through the opening 72a and fixed thereto. The arc tube 80 described later is fixed to the cylindrical portion 72 of the reflector 70 by inserting the end of the sealing portion through the opening 72a and filling the clearance between the opening 72a and the sealing portion 82 with an inorganic adhesive C such as cement.

Preferable examples of the base material for constituting the reflector 70 (the reflector main body 71 and the cylindrical portion 72) are crystallized glass and alumina ($Al_2O_3$). The reflection layer 73 is formed by dielectric multilayer film made of titanium oxide ($TiO_2$) and silicon oxide ($SiO_2$).

As illustrated in FIGS. 2A and 2B, the arc tube includes the light emission portion 81 having a spherical shape, and a pair of the columnar sealing portions 82 and 83 extending from both sides of the light emission portion 81 along the illumination axis L. The arc tube 80 has a pair of electrodes 84 and 85 contained in the light emission portion 81 and disposed close to and opposed to each other along the illumination axis L, a pair of metal foils 86 and 87 sealed within the pair of the sealing portions 82 and 83, respectively, and a pair of leads 88 and 89 electrically connected with the metal foils 86 and 87, respectively.

The conditions and the like of the elements included in the arc tube 80 are as follows, for example. The light emission portion 81 and the sealing portions 82 and 83 are made of quartz glass or the like, and mercury, rare gas, and a small amount of metal halogenated material are sealed into the light emission portion 81. The electrodes 84 and 85 are tungsten electrodes or the like, and the metal foils 86 and 87 are molybdenum foils or the like. The leads 88 and 89 are made of molybdenum or tungsten, for example. The arc tube 80 can be formed by various types of arc tube capable of emitting light having high luminance, such as a high-pressure mercury lamp, an extra-high pressure mercury lamp, and a metal halide lamp.

The sub mirror 90 covering approximately the half of the light emission portion 81 is a component disposed opposed to the concave surfaces 71a and 71b of the reflector 70 to reflect light emitted toward the illumination area from the arc tube 80 again toward the arc tube 80. The sub mirror 90 includes a sub mirror main body 91 having a concave surface 91a, and a cylindrical portion 92 having an opening 92a through which the sealing portion (the other sealing portion) 83 of the arc tube 80 is inserted to be fixed to the opening 92a. The sub mirror main body 91 and the cylindrical portion 92 constituting the sub mirror 90 are formed integrally with each other. A reflection layer 93 having high reflectance is formed on the concave surface 91a of the sub mirror main body 91. The light emitted from the arc tube 80 and reflected by the reflection layer 93 toward the arc tube 80 passes through the arc tube 80 and reaches the reflector 70.

The material for constituting the sub mirror 90 (the sub mirror main body 91 and the cylindrical portion 92) is quartz glass, for example. The reflection layer is formed by dielectric multilayer film made of tantalum oxide ($Ta_2O_3$) and silicon oxide ($SiO_2$), for example.

The sub mirror 90 having this structure is fixed to the sealing portion 83 of the arc tube 80 by inserting the sealing portion 83 of the arc tube 80 through the opening 92a of the cylindrical portion 92 and filling the clearance between the opening 92a of the cylindrical portion 92 and the sealing portion 83 with the inorganic adhesive C such as cement.

The rectifying portion 100 is disposed between the one sealing portion 82 and the reflector 70 to regulate the flow direction of the cooling air W1 introduced into the light source device 61. The rectifying portion 100 transmits light emitted from the arc tube 80 toward the reflection layer 73 of the reflector 70, and further transmits light in the opposite direction reflected by the reflection layer 73 toward the illumination area. In this embodiment, the rectifying portion 100 has a disk-shaped rectifying portion main body 101 as illustrated in FIG. 2B. The rectifying portion 100 further has an opening 101a at the center.

A support member 110 as a support portion is a component for supporting the rectifying portion 100 on the one sealing portion 82 and fixing the rectifying portion 100 to the one sealing portion 82. The support member 110 includes a disk-shaped support portion main body 111, and a flange 112 formed on the periphery of the support portion main body 111. An opening 111a is formed inside the support portion main body 111.

According to this embodiment, the rectifying portion 100 is formed integrally with the support member 110 by inserting the support portion main body 111 through the opening 101a of the rectifying portion main body 101 and bringing the rectifying portion 100 into contact with the surface of the flange 112, and then heating the rectifying portion 100. The rectifying portion 100 thus formed is fixed to the sealing portion 82 by inserting the sealing portion 82 of the arc tube 80 through the opening 111a of the support portion main body 111 and filling the clearance between the sealing portion and the opening 111a of the support member 110 with the inorganic adhesive C such as cement. In this condition, substantially no clearance is produced between an outer circumferential end 101b of the rectifying portion 100 and the reflection layer 73 in this embodiment.

The rectifying portion 100 fixed to the sealing portion 82 via the support member 110 is disposed in such a position as to be substantially orthogonal to the illumination axis L in this embodiment. The rectifying portion main body 101 has a flat surface to which anti-reflection processing is applied. The materials for constituting the rectifying portion 100 and the support member 110 are quartz glass, for example. Alternatively, low thermal expansion glass such as neoceram (registered trademark) and high heat conductive material such as sapphire may be used.

The reflection layer 73 (73b) of the reflector 70 receiving the light transmitted through the rectifying portion 100 has a shape withdrawn from the reflection layer 73 (73a) of the reflector 70 receiving light not transmitted through the rectifying portion 100. The reflection layer 73b corresponds to the concave surface 71b, and the reflection layer 73a corresponds to the concave surface 71a. The light transmitted through the rectifying portion 100 has a longer optical path length than that of the light not transmitted through the rectifying portion 100. Thus, the optical path length of the light transmitted through the rectifying portion 100 is corrected by the structure of the reflection layer 73 (73b).

The housing 9 made of resin having high heat resistance or the like fixes the reflector 70 and the concave lens 11. The housing 9 isolates a space C1 formed between the reflector 70 (and the rectifying portion 100) and the concave lens 11 from the surroundings to prevent leakage of unnecessary light emitted from the arc tube 80 to the outside as stray light. An air intake port 9a is formed on the upper wall surface of the housing 9 in the +Z direction as the side surface of the housing 9. Also, an air discharge port 9b is formed on the lower wall surface of the housing 9 in the −Z, direction. Air for cooling (cooling air) is introduced from the outside through the air intake port 9a, and air after cooling is discharged through the air discharge port 9b.

The cooling mechanism 500 is a cooling device which cools heat generated by light emission from the light emission portion 81 of the arc tube 80 in cooperation with the air intake port 9a, the air discharge port 9b and the like. The cooling mechanism 500 includes a cooling fan 510 for delivering cooling air, a duct 520 for introducing the generated cooling air to the air intake port 9a of the housing 9, a louver 530 for controlling the flow direction of the cooling air flowing through the air intake port 9a toward the space C1 of the housing 9 (the space C1 of the light source unit 1), and other parts. A discharge duct (not shown) is further provided inside the projector 600 in such a position as to face the air discharge port 9b. The heated cooling air passing through the air discharge port 9b is discharged through the discharge duct to the outside of the projector 600.

The flow of the cooling air W1 (indicated by broken lines with arrows) introduced through the air intake port 9a to the space C1 of the light source unit 1 by operation of the cooling mechanism 500 is now described.

The cooling air W1 having the flowing direction regulated by the louver 530 of the cooling mechanism 500 is introduced to the space C1 of the housing 9 through the air intake port 9a, and flows toward the reflector 70. The cooling air W1 having reached the reflector 70 flows along the reflection layer 73 of the reflector 70.

The cooling air W1 flowing along the reflection layer 73 of the reflector 70 flows in the direction along the flat surface of the rectifying portion 100 (−Z direction) by the function of the rectifying portion 100 for regulating the flow direction. Then, the cooling air W1 regulated by the rectifying portion 100 flows from an area A in the upper region of the light emission portion 81 to an area B on the reflector 70 side of the light emission portion 81. By the flow of the cooling air W1, the area B as well as the area A are cooled. Then, the cooling air W1 flows in the direction along the flat surface of the rectifying portion 100 (−Z direction), and again flows along the reflection layer 73 away from the rectifying portion 100. Finally, the cooling air W1 is discharged through the air discharge port 9b.

This embodiment provides the following advantages.

(1) According to the light source device 61 in this embodiment, the cooling air W1 introduced to flow along the reflection layer 73 of the reflector 70 flows along the rectifying portion 100 disposed between the light emission portion 81 and the reflector 70 by the function of the rectifying portion 100 for regulating the flow direction. Since the rectifying portion 100 transmits light emitted from the arc tube 80 and further transmits light reflected by the reflection layer 73, the light amount from the light source device 61 becomes similar to that from a light source device in related art. In this case, the cooling air W1 easily flows to the area A in the upper region of the light emission portion 81 as an area having high temperature, and also flows to the area B on the reflector 70 side of the light emission portion 81. Thus, the heat on the area. A in the upper region of the light emission portion 81 as the area having high temperature can be efficiently cooled. Moreover, even when air is supplied to adjust the temperature of the area A in the upper region of the light emission portion 81 to an appropriate temperature, the area B on the reflector 70 side of the light emission portion 81 is not excessively cooled. Thus, the upper area (area A) of the light emission portion 81 can be efficiently cooled, and the temperatures of the upper area of the light emission portion 81 (area A) and the reflector 70 side of the light emission portion 81 (area B) can be properly controlled such that the temperature difference between the area A and the area B can be reduced. Accordingly, the light source device 61 having uniform temperature distribution in the direction of the illumination axis L can be produced.

(2) According to the light source device 61 in this embodiment, the rectifying portion 100 can be securely fixed to the one sealing portion 82 in a proper position for the reflection layer 73 of the reflector 70 and the arc tube 80 by using the support member 110, and can be operated in a stable condition without affected by the flow of the cooling air W1.

(3) According to the light source device 61 in this embodiment, the rectifying portion 100 is disposed substantially orthogonal to the illumination axis L. Thus, even when the condition of the light source device 61 is switched from the normal condition to the suspension condition to use the light source device 61 upside down, the difference between the position of the rectifying portion 100 in the suspension condition and that position in the normal condition is small. Accordingly, the above advantages of the rectifying portion 100 can be offered in the suspension condition similarly to the normal condition. In this case, an air discharge port (not shown) on the upper wall surface of the housing 9 in the +Z direction and an air intake port (not shown) on the lower wall in the −Z direction are added. Also, the duct 520 of the cooling mechanism 500 is branched in two directions and connected to the air intake ports in the +Z direction and the −Z direction. In addition, a switching unit (not shown) for switching such that the cooling air W1 can always flow toward the air intake port positioned at the upper position in the direction of gravity at the time of switching the position is provided to use the light source device 61 both in the normal condition and the suspension condition.

(4) According to the light source device 61 in this embodiment, the rectifying portion 100 has a flat surface. Thus, the rectifying portion 100 can be manufactured at low manufacturing cost by forming the rectifying portion 100 from a plate-shaped material.

(5) According to the light source device 61 in this embodiment, the rectifying portion 100 has a substantially circular flat shape. Thus, the shape of the rectifying portion 100 can be matched with the inner surface shape of the reflection layer 73. Accordingly, the flow of the cooling air W1 can be securely regulated.

(6) According to the light source device 61 in this embodiment, anti-refection processing is applied to the surface of the rectifying portion 100. Thus, light emitted from the light emission portion 81 and light reflected by the reflection layer 73 are prevented from being changed in their optical paths due to reflection by the rectifying portion 100 when the lights are passing through the rectifying portion 100. Accordingly, the efficiency of extracting the light emitted from the light emission portion 81 to the outside of the light source device 61 can be improved.

(7) According to the light source device 61 in this embodiment, the upper area of the light emission portion 81 (area A) can be efficiently cooled, and the temperatures of the upper area of the light emission portion 81 and the reflector 70 side of the light emission portion 81 can be properly controlled such that the temperature difference between the area A and the area B can be reduced. Thus, the temperature distribution in the direction of the illumination axis L becomes uniform, and whitening and blackening of the light emission portion 81 can be reduced. Accordingly, problems such as lowering of the light amount caused by loss of transparency of the light emission portion 81 and corruption of the light emission portion 81 caused by development of whitening or blackening can be prevented, and the life of the light source device 61 can be increased.

(8) According to the light source device 61 in this embodiment capable of providing the above advantages, the number of revolutions of the cooling fan 510 can be made smaller than that of a cooling fan in related art. Thus, the noise of the projector 600 can be reduced. Moreover, the power consumption of the cooling fan 510 during operation can be decreased.

(9) According to this embodiment, the projector 600 includes the light source device 61 having a long life. When the light source device 61 having a long life is incorporated in the projector 600 or other apparatus, the number of times for replacing the light source device 61 is lowered. Thus, the amount of produced industrial waste can be reduced.

Second Embodiment

Figure 3A:
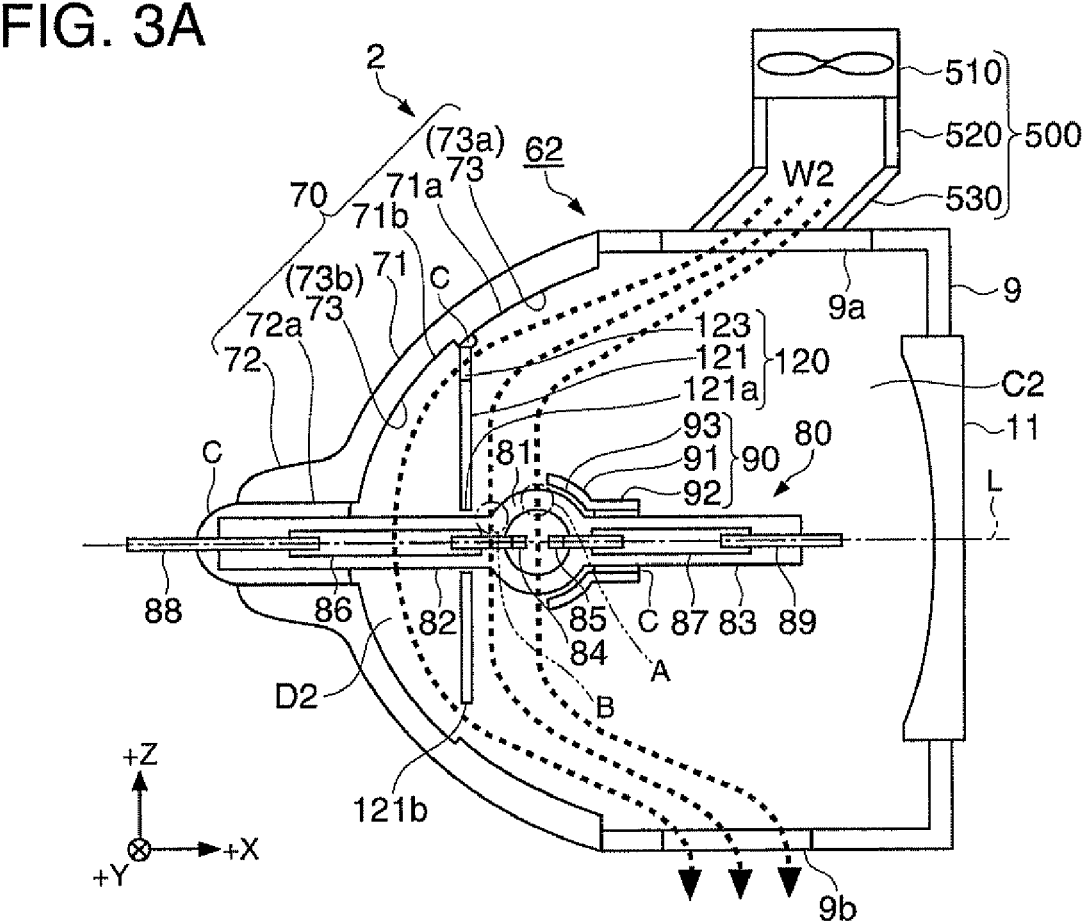
Figure 3B:
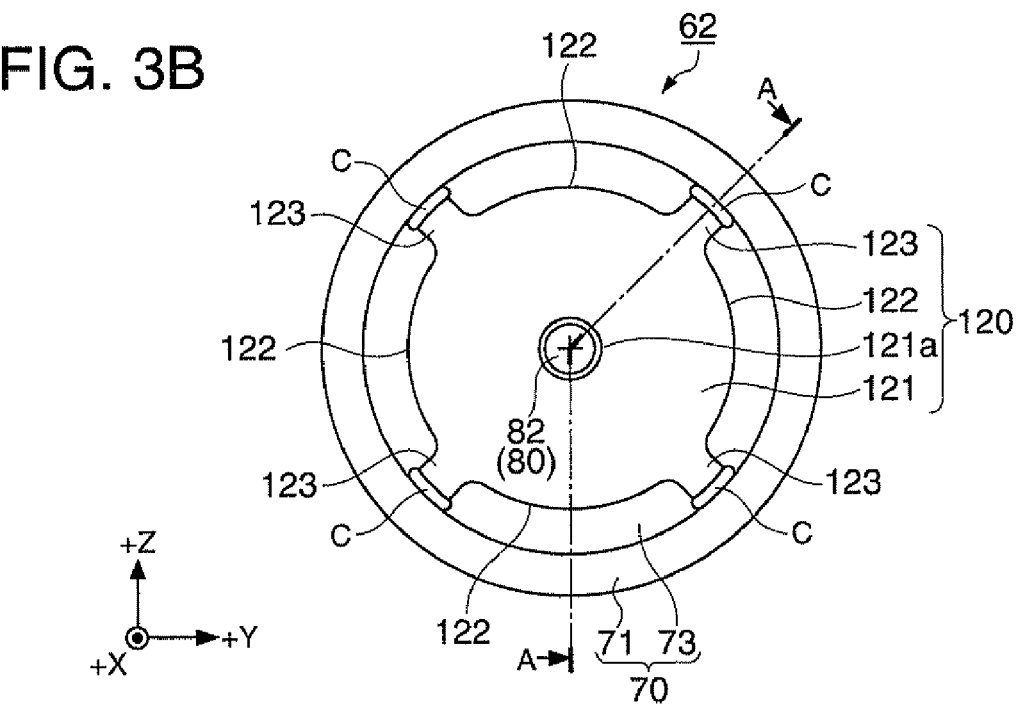

FIGS. 3A and 3B illustrate a light source unit according to a second embodiment. FIG. 3A is a cross-sectional view showing the side of the light source unit. FIG. 3B is a front view showing a connecting area between the light emission portion and one of the sealing portions as viewed from the reflector side, the connecting area containing a condition cut along a plane orthogonal to the illumination axis. A rectifying portion 120 in FIG. 3A is shown as a cross section taken along a line A-A in FIG. 3B for simplifying the explanation. In FIGS. 3A and 3B, similar reference numbers are given to parts similar to those in the first embodiment, and the same explanation is not repeated herein. The XYZ orthogonal coordinate system shown in FIGS. 3A and 3B is similar to the XYZ orthogonal coordinate system shown in FIG. 1 and used in the first embodiment. The projector 600 in the second embodiment is similar to the projector 600 in the first embodiment except for that a light source unit 2 is included in lieu of the light source unit 1 in the optical systems of the projector 600 in the first embodiment.

The structure and operation of the light source unit 2 in the second embodiment are now described with reference to FIGS. 3A and 3B.

The light source unit 2 in the second embodiment includes the concave lens 11 and the housing 9 similarly to the first embodiment. In the second embodiment, the rectifying portion 120 included in a light source device 62 is different from the rectifying portion 100 included in the light source device 61 in the first embodiment. In the second embodiment, no support portion such as the support member 110 in the first embodiment is used. The rectifying portion 120 in the second embodiment is disposed between the one sealing portion 82 and the reflector 70 similarly to the rectifying portion 100 in the first embodiment, and performs operation similar to that of the rectifying portion 100 in the first embodiment.

In the second embodiment, the rectifying portion 120 includes a disk-shaped rectifying portion main body 121 having a flat surface as illustrated in FIG. 3B. The rectifying portion 120 further has four notches 122 formed on the edge of the rectifying portion main body 121 at equal intervals, and four fixing portions 123 as the remaining edges after removal of the notches 122 to provide portions to be fixed to the reflector 70. An opening 121a is further formed at the center of the rectifying portion main body 121.

The rectifying portion 120 is produced by inserting the sealing portion 82 of the arc tube 80 through the opening 121a, and bringing the fixing portions 123 of the rectifying portion 120 into contact with the reflection layer 73 in a direction substantially orthogonal to the illumination axis L. Then, the ends of the four fixing portions 123 contacting the reflection layer 73 are fixed to the reflection layer 73 by the inorganic adhesive C such as cement. The opening 121a of the rectifying portion 120 is positioned away from the outer circumferential surface of the sealing portion 82 of the arc tube 80. Anti-reflection processing is applied to the surface of the rectifying portion 120 similarly to the first embodiment, and the material constituting the rectifying portion 120 is similar to that of the rectifying portion 100 in the first embodiment.

The flow of cooling air W2 (indicated by broken lines with arrows) introduced through the air intake port 9a to a space C2 of the light source unit 2 by operation of the cooling mechanism 500 is now explained.

The cooling air W2 having the flowing direction regulated by the louver 530 of the cooling mechanism 500 flows to the space C2 of the housing 9 through the air intake port 9a, and flows toward the reflector 70. The cooling air W2 having reached the reflector 70 flows along the reflection layer 73 of the reflector 70.

The flow direction of the cooling air W2 flowing along the reflection layer 73 of the reflector 70 is regulated by the rectifying portion 120. More specifically, a part of the cooling air W2 flowing along the reflection layer 73 flows toward a space D2 surrounded by the reflector 70 and the rectifying portion 120 via the notch 122 of the rectifying portion 120 positioned in the +Z direction. Most of the remaining cooling air W2 flows in the direction along the flat surface of the rectifying portion 120 (−Z direction).

The cooling air W2 flowing in the direction along the flat surface of the rectifying portion 120 (−Z direction) flows from the area A in the upper region of the light emission portion 81 to the area B on the reflector 70 side of the light emission portion 81. By the flow of the cooling air W2, the area B as well as the area A are cooled. Then, the cooling air W2 flows in the direction along the flat surface of the rectifying portion 120 (−Z direction), and again flows along the reflection layer 73 away from the rectifying portion 120. Finally, the cooling air W2 is discharged through the air discharge port 9b.

On the other hand, the cooling air W2 introduced to the space D2 surrounded by the reflector 70 and the rectifying portion 120 cools the space D2, and again flows out through the notch 122 positioned in the −Z direction and moves along the reflection layer 73. Then, the cooling air W2 is discharged through the air discharge port 9b.

The light source unit 2 according to this embodiment has structure similar to that of the light source unit 1 (the light source device 61) in the first embodiment except for that the support portion is not included and that different structure and fixing method of the rectifying portion 120 of the light source device 62 are used. Thus, the following advantages as well as the corresponding ones of the advantages of the light source device 61 in the first embodiment are provided.

(1) According to the light source device 62 in the second embodiment, the notches 122 are formed on the edge of the rectifying portion 120. Thus, the cooling air W2 can be introduced through the notches 122 to the space D2 surrounded by the reflector 70 and the rectifying portion 120. Accordingly, the heat in the space D2 can be properly cooled.

(2) According to the light source device 62 in the second embodiment, the rectifying portion 120 is fixed to the reflection layer 73 of the reflector 70. Thus, the effect on the sealing portion 82 caused by thermal stress produced when the rectifying portion 120 is fixed to the sealing portion 82 can be reduced.

Third Embodiment

Figure 4:
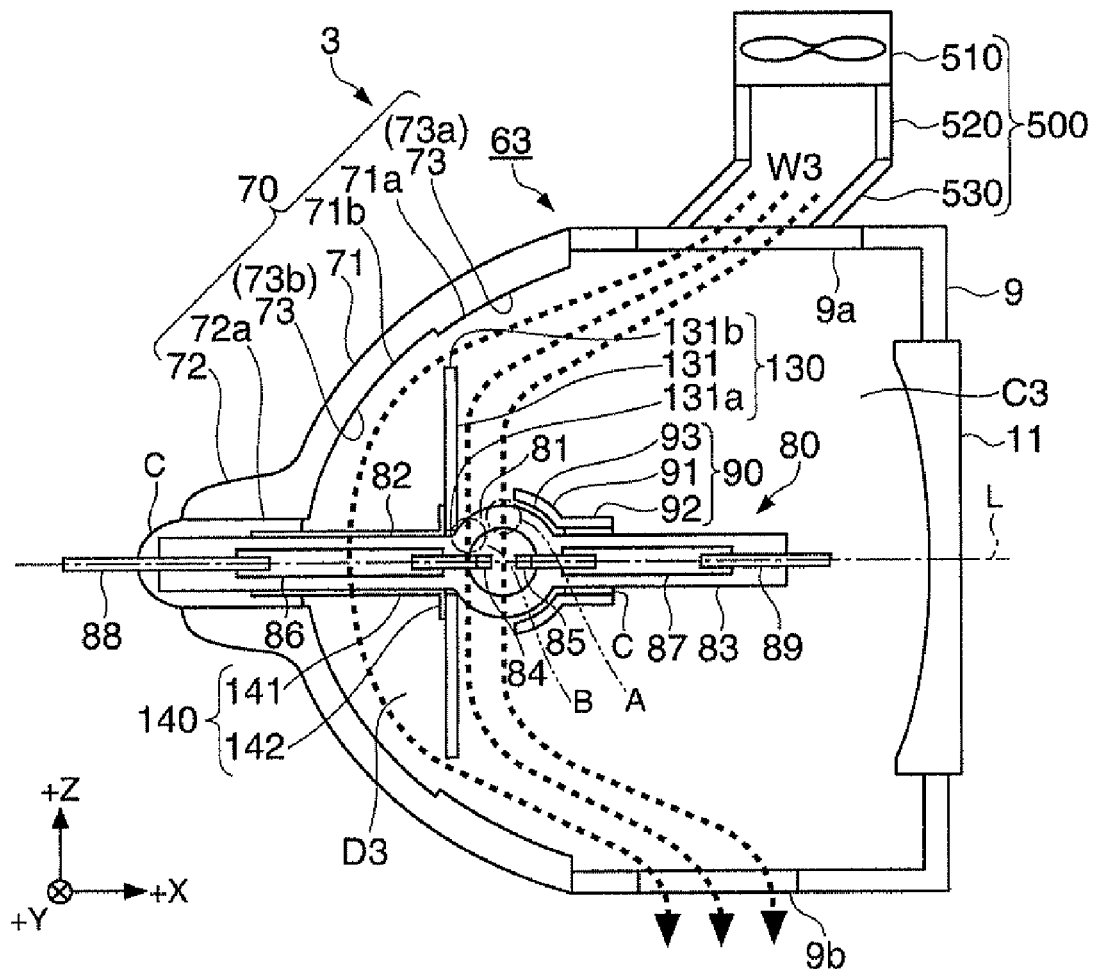
FIG. 4 is a cross-sectional view illustrating the side of a light source unit according to a third embodiment.

FIG. 4 is a cross-sectional view illustrating the side of a light source unit according to a third embodiment. In FIG. 4, similar reference numbers are given to parts similar to those in the first embodiment, and the same explanation is not repeated herein. The XYZ orthogonal coordinate system shown in FIG. 4 is similar to the XYZ orthogonal coordinate system shown in FIG. 1 and used in the first embodiment. The projector 600 in the third embodiment is similar to the projector 600 in the first embodiment except for that a light source unit 3 is included in lieu of the light source unit 1 in the optical systems of the projector 600 in the first embodiment.

The structure and operation of the light source unit 3 in the third embodiment are now described with reference to FIG. 4.

The light source unit 3 in the third embodiment includes the concave lens 11 and the housing 9 similarly to the first embodiment. In the third embodiment, a rectifying portion 130 included in a light source device 63 and a support member 140 fixing the rectifying portion 130 are different from the rectifying portion 100 and the support member 110 included in the light source device 61 in the first embodiment. The rectifying portion 130 in the third embodiment is disposed between the one sealing portion 82 and the reflector 70 similarly to the rectifying portion 100 in the first embodiment and performs operation similar to that of the rectifying portion 100 in the first embodiment.

In the third embodiment, the rectifying portion 130 includes a disk-shaped rectifying portion main body 131 having a flat surface as illustrated in FIG. 4. An opening 131a is further formed at the center of the rectifying portion main body 131.

The support member 140 as the support portion in this embodiment includes a cylindrical support portion main body 141, and a flange 142 formed on the periphery of the support portion main body 141. In this embodiment, the rectifying portion 130 is produced by inserting the sealing portion 82 through the opening 131a of the rectifying portion main body 131, and further through the inner surface of the support portion main body 141 of the support member 140. Then, the support member 140 is shifted along the outer surface of the sealing portion 82 toward the light emission portion 81, and the rectifying portion 130 is pressed against the surface of the flange 142 of the support member 140 and brought into contact with the light emission portion 81. By this method, the rectifying portion 130 is sandwiched between the outer surface of the light emission portion 81 and the flange 142 of the support member 140 to be fixed therebetween.

The support member 140 is formed by a pipe-shaped metal component, and the support portion main body 141 has a length sufficient for reaching the inside of the opening 72a of the reflector 70 under the condition in which the rectifying portion 130 is sandwiched between the light emission portion 81 and the support member 140. Thus, after the rectifying portion 130 is sandwiched between the light emission portion 81 and the support portion main body 141, the clearance between the opening 72a and the ends of the sealing portion 82 and the support portion main body 141 inserted through the opening 72a is filled with the inorganic adhesive C such as cement to fix the sealing portion 82 and the support portion main body 141.

According to this embodiment, a substantially constant clearance is formed between an outer circumferential end 131b of the rectifying portion 130 and the opposed reflection layer 73 in this condition. The rectifying portion 130 sandwiched between the light emission portion 81 and the support member 140 and fixed therebetween is disposed substantially orthogonal to the illumination axis L. Anti-reflection processing is applied to the surface of the rectifying portion 130 similarly to the first embodiment, and the material constituting the rectifying portion 130 is similar to that of the rectifying portion 100 in the first embodiment.

The flow of cooling air W3 (indicated by broken lines with arrows) introduced through the air intake port 9a to a space C3 of the light source unit 3 by operation of the cooling mechanism 500 is now explained. The flow of the cooling air W3 in this embodiment is substantially similar to the flow of the cooling air W2 in the second embodiment.

The cooling air W3 flows to the space C3 of the housing 9 through the air intake port 9a by the operation of the cooling mechanism 500, and moves toward the reflector 70. The cooling air W3 having reached the reflector 70 flows along the reflection layer 73 of the reflector 70. A part of the cooling air W3 flows toward a space D3 surrounded by the reflector 70 and the rectifying portion 130 via the clearance between the outer circumferential end 131b of the rectifying portion 130 in the +Z direction and the reflection layer 73. Most of the remaining cooling air W3 flows in the direction along the flat surface of the rectifying portion 130 (−Z direction).

The cooling air W3 flowing in the direction along the flat surface of the rectifying portion 130 (−Z direction) flows from the area A in the upper region of the light emission portion 81 to the area B on the reflector 70 side of the light emission portion 81. By the flow of the cooling air W3, the area B as well as the area A are cooled. Then, the cooling air W3 flows in the direction along the flat surface of the rectifying portion 130 (−Z direction), and again flows along the reflection layer 73 away from the rectifying portion 130. Finally, the cooling air W3 is discharged through the air discharge port 9b.

On the other hand, the cooling air W3 introduced to the space D3 surrounded by the reflector 70 and the rectifying portion 130 cools the space D3, and again flows out through the clearance between the outer circumferential end 131b in the −Z direction and the reflection layer 73 and moves along the reflection layer 73. Then, the cooling air W3 is discharged through the air discharge port 9b.

The light source unit 3 according to the third embodiment has structure similar to that of the light source unit 1 (the light source device 61) in the first embodiment except for that different structure and fixing method of the rectifying portion 130 of the light source device 63 and the support member 140 are used. Thus, the following advantages as well as the corresponding ones of the advantages of the light source device 61 in the first embodiment are provided.

(1) According to the light source device 63 in this embodiment, the rectifying portion 130 is sandwiched between the light emission portion 81 and the support member 140 and fixed therebetween. Thus, the rectifying portion 130 can be securely fixed, and can be operated in a stable condition without affected by the flow of the cooling air W3. Moreover, the effect of thermal stress on the sealing portion 82 can be reduced by avoiding direct fixture to the sealing portion 82 by using an adhesive or the like.

Fourth Embodiment

Figure 5:
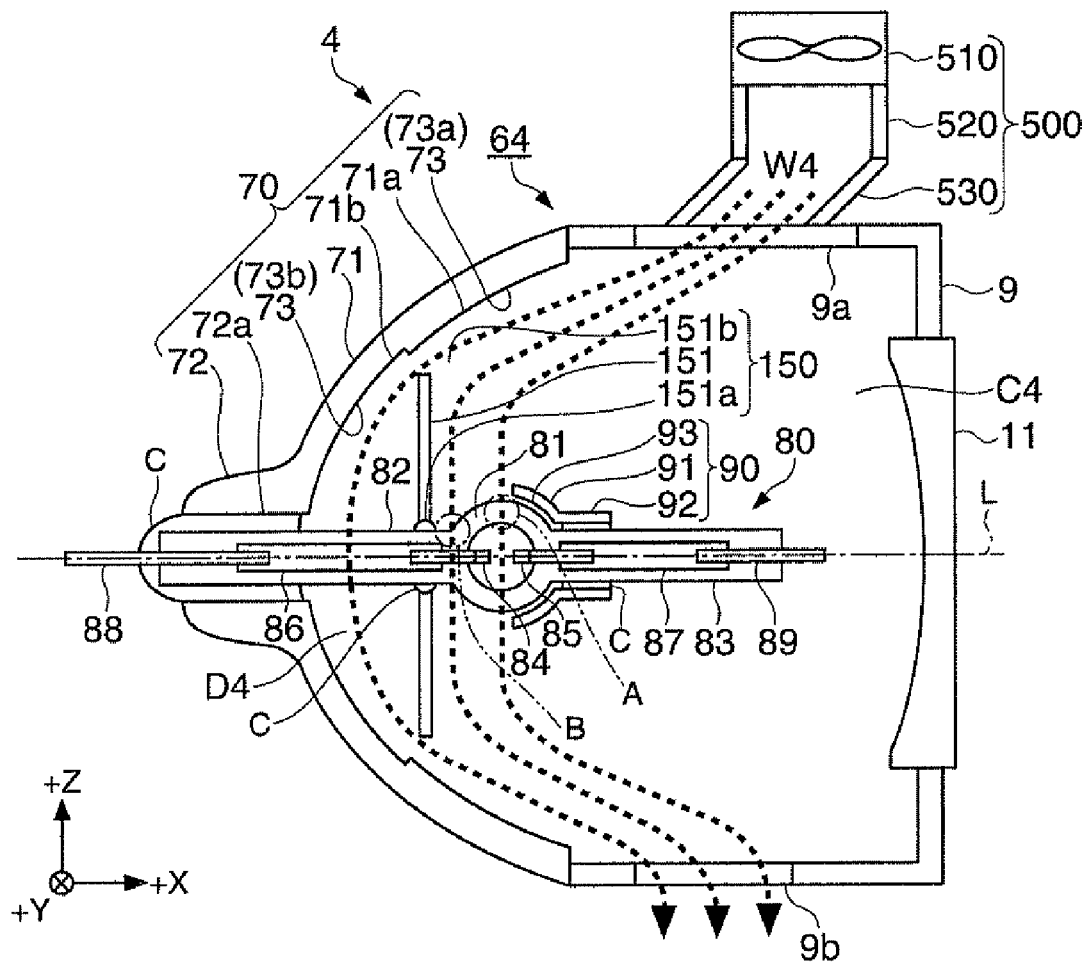
FIG. 5 is a cross-sectional view illustrating the side of a light source unit according to a fourth embodiment.

FIG. 5 is a cross-sectional view illustrating the side of a light source unit according to a fourth embodiment. In FIG. 5, similar reference numbers are given to parts similar to those in the first embodiment, and the same explanation is not repeated herein. The XYZ orthogonal coordinate system shown in FIG. 5 is similar to the XYZ orthogonal coordinate system shown in FIG. 1 and used in the first embodiment. The projector 600 in the fourth embodiment is similar to the projector 600 in the first embodiment except for that a light source unit 4 is included in lieu of the light source unit 1 in the optical systems of the projector 600 in the first embodiment.

The structure and operation of the light source unit 4 in the fourth embodiment are now described with reference to FIG. 5.

The light source unit 4 in the fourth embodiment includes the concave lens 11 and the housing 9 similarly to the first embodiment. In the fourth embodiment, a rectifying portion 150 included in a light source device 64 is different from the rectifying portion 100 included in the light source device 61 in the first embodiment. In the fourth embodiment, no support portion such as the support member 110 in the first embodiment is used. The rectifying portion 150 in the fourth embodiment is disposed between the one sealing portion 82 and the reflector 70 similarly to the rectifying portion 100 in the first embodiment and performs operation similar to that of the rectifying portion 100 in the first embodiment.

In the fourth embodiment, the rectifying portion 150 includes a disk-shaped rectifying portion main body 151 having a flat surface. An opening 151a is further formed at the center of the rectifying portion main body 151. The rectifying portion 150 is produced by inserting the sealing portion 82 of the arc tube 80 through the opening 151a such that the rectifying portion 150 can be positioned in a direction substantially orthogonal to the illumination axis L. Then, the rectifying portion 150 is fixed to the sealing portion 82 by filling the clearance between the opening 151a and the sealing portion 82 with the inorganic adhesive C such as cement. In this embodiment, a substantially constant clearance is produced between an outer circumferential end 151b of the rectifying portion 150 and the opposed reflection layer in this condition. Anti-reflection processing is applied to the surface of the rectifying portion 150 similarly to the first embodiment, and the material constituting the rectifying portion 150 is similar to that of the rectifying portion 100 in the first embodiment.

The flow of cooling air W4 (indicated by broken lines with arrows) introduced through the air intake port 9a to a space C4 of the light source unit 4 by operation of the cooling mechanism 500 is now explained. The flow of the cooling air W4 in this embodiment is substantially similar to the flow of the cooling air W2 in the second embodiment.

The cooling air W4 flows to the space C4 of the housing 9 through the air intake port 9a by the operation of the cooling mechanism 500, and moves toward the reflector 70. The cooling air W4 having reached the reflector 70 flows along the reflection layer 73 of the reflector 70. A part of the cooling air W4 flows toward a space D4 surrounded by the reflector 70 and the rectifying portion 150 via the clearance between the outer circumferential end 151b of the rectifying portion 150 in the +Z direction and the reflection layer 73. Most of the remaining cooling air W4 flows in the direction along the flat surface of the rectifying portion 150 (−Z direction).

The cooling air W4 flowing in the direction along the flat surface of the rectifying portion 150 (−Z direction) flows from the area A in the upper region of the light emission portion 81 to the area B on the reflector 70 side of the light emission portion 81. By the flow of the cooling air W4, the area B as well as the area A are cooled. Then, the cooling air W4 flows in the direction along the flat surface of the rectifying portion 150 (−Z direction), and again flows along the reflection layer 73 away from the rectifying portion 150. Finally, the cooling air W4 is discharged through the air discharge port 9b.

On the other hand, the cooling air W4 introduced to the space D4 surrounded by the reflector 70 and the rectifying portion 150 cools the space D4, and again flows out through the clearance between the outer circumferential end 151b in the −Z direction and the reflection layer 73 and moves along the reflection layer 73. Then, the cooling air W4 is discharged through the air discharge port 9b.

The light source unit 4 according to the fourth embodiment has structure similar to that of the light source unit 1 (the light source device 61) in the first embodiment except for that no support portion is included and that different structure and fixing method of the rectifying portion 150 of the light source device 64 are used. Thus, the following advantages as well as the corresponding ones of the advantages of the light source device 61 in the first embodiment are provided.

(1) According to the light source device 64 in the fourth embodiment, the rectifying portion 150 is directly fixed to the sealing portion 82. Thus, the structure can be simplified, and the manufacturing cost of the light source device 64 can be reduced.

Fifth Embodiment

Figure 6:
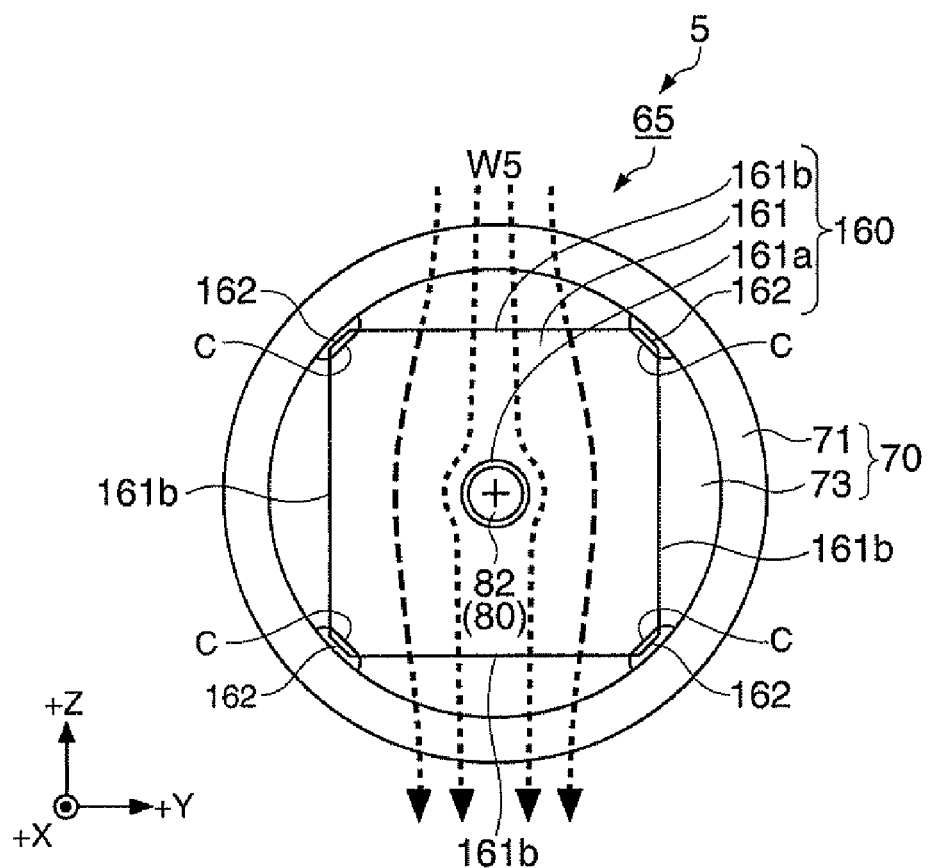
FIG. 6 illustrates a light source unit according to a fifth embodiment.

FIG. 6 illustrates a light source unit according to a fifth embodiment. More specifically, FIG. 6 is a front view showing a connecting area between the light emission portion 81 and the one sealing portion 82 as viewed from the reflector 70 side, the connecting area containing a condition cut along a plane orthogonal to the illumination axis L. In FIG. 6, similar reference numbers are given to parts similar to those in the first embodiment, and the same explanation is not repeated herein. The XYZ orthogonal coordinate system shown in FIG. 6 is similar to the XYZ orthogonal coordinate system shown in FIG. 1 and used in the first embodiment. The projector 600 in the fifth embodiment is similar to the projector 600 in the first embodiment except for the point that a light source unit 5 is included in lieu of the light source unit 1 in the optical systems of the projector 600 in the first embodiment.

The structure and operation of the light source unit 5 in the fifth embodiment are now described with reference to FIG. 6.

The light source unit 5 in the fifth embodiment includes the concave lens 11 and the housing 9 similarly to the first embodiment. In the fifth embodiment, a rectifying portion 160 included in a light source device 65 is different from the rectifying portion 100 included in the light source device 61 in the first embodiment. In the fifth embodiment, no support portion such as the support member 110 in the first embodiment is used. The rectifying portion 160 in the fifth embodiment is disposed between the one sealing portion 82 and the reflector 70 similarly to the rectifying portion 100 in the first embodiment and performs operation similar to that of the rectifying portion 100 in the first embodiment.

In the fifth embodiment, the rectifying portion 160 includes a rectangular rectifying portion main body 161 having a flat surface. An opening 161a is further formed at the center of the rectifying portion main body 161. Corners 162 of the rectifying portion main body 161 are formed as tapered surfaces corresponding to the shape of the reflection layer 73.

The rectifying portion 160 is produced by inserting the sealing portion 82 of the arc tube 80 through the opening 161a and bringing the corners 162 of the rectifying portion 160 into contact with the reflection layer 73 in a direction substantially orthogonal to the illumination axis L. Then, the ends of the four corners 162 contacting the reflection layer 73 are fixed to the reflection layer 73 by the inorganic adhesive C such as cement. In this embodiment, clearances are produced between four outer circumferential ends 161b of the rectifying portion 160 and the opposed reflection layer 73 in this condition. The opening 161a of the rectifying portion 160 is positioned away from the outer circumferential surface of the sealing portion 82 of the arc tube 80. Anti-reflection processing is applied to the surface of the rectifying portion 160 similarly to the first embodiment, and the material constituting the rectifying portion 160 is similar to that of the rectifying portion 100 in the first embodiment.

The flow of cooling air W5 (indicated by broken lines with arrows) introduced through the air intake port 9a to a space of the light source unit 5 by operation of the cooling mechanism 500 is now explained. The flow of the cooling air W5 in this embodiment is substantially similar to the flow of the cooling air W2 in the second embodiment. Thus, only the point different from the second embodiment is herein explained.

The different point is that a part of the cooling air W5 introduced to the space of the housing 9 flows to a space surrounded by the reflector 70 and the rectifying portion 160 through the clearance between the outer circumferential end 161b of the rectangular rectifying portion 160 positioned in the +Z direction and the reflection layer 73. The regulation of the flow direction of the cooling air W5 by the rectifying portion 160 and the operation of the regulated cooling air W5 are substantially similar to those in the second embodiment.

The light source unit 5 according to the fifth embodiment has structure similar to that of the light source unit 1 (the light source device 61) in the first embodiment except for that no support portion is included and that different structure and fixing method of the rectifying portion 160 of the light source device 65 are used. Thus, the following advantages as well as the corresponding ones of the advantages of the light source device 61 in the first embodiment are provided.

(1) According to the light source device 65 in the fifth embodiment, the rectifying portion 160 has a substantially rectangular flat shape. Thus, clearances are produced between the reflection layer 73 and the outer circumferential ends 161b of the rectifying portion 160 by the difference between the inner surface shape of the reflection layer 73 and the rectangular shape of the rectifying portion 160. Thus, the cooling air W5 can be introduced to the space surrounded by the reflection layer 73 and the rectifying portion 160 through the clearances thus produced. The rectifying portion 160 having the substantially rectangular flat shape can be produced by only slight processing for forming the outer shape of the rectifying portion 160. Thus, the manufacturing cost of the rectifying portion 160 can be reduced. Moreover, a larger number of the rectifying portion 160 having the rectangular flat shape can be produced from a material compared with the case of a circular rectifying portion. Thus, the manufacturing cost can be further reduced. In addition, resources can be efficiently used.

Sixth Embodiment

Figure 7:
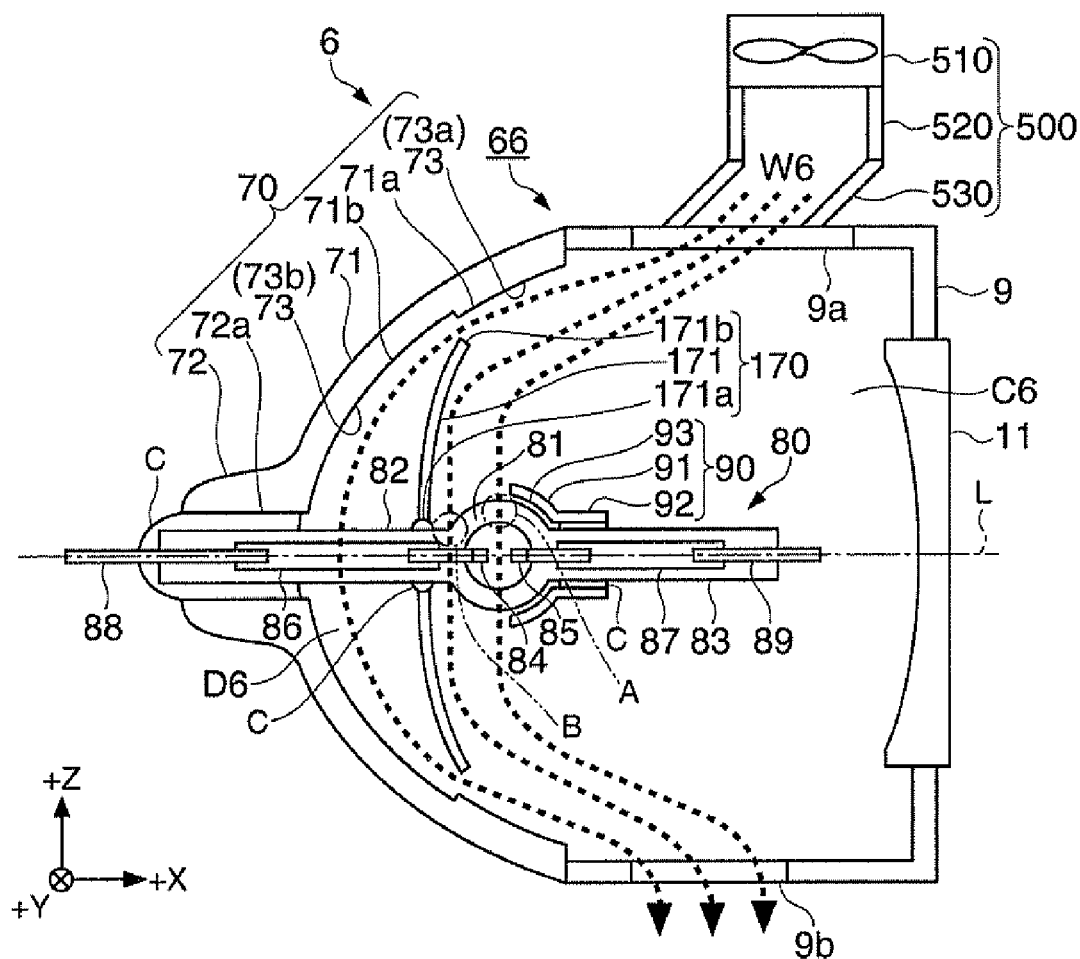
FIG. 7 is a cross-sectional view illustrating the side of a light source unit according to a sixth embodiment.

FIG. 7 is a cross-sectional view illustrating the side of a light source unit according to a sixth embodiment. In FIG. 7, similar reference numbers are given to parts similar to those in the first embodiment, and the same explanation is not repeated herein. The XYZ orthogonal coordinate system shown in FIG. 7 is similar to the XYZ orthogonal coordinate system shown in FIG. 1 and used in the first embodiment. The projector 600 in the sixth embodiment is similar to the projector 600 in the first embodiment except for that a light source unit 6 is included in lieu of the light source unit 1 in the optical systems of the projector 600 in the first embodiment.

The structure and operation of the light source unit 6 in the sixth embodiment are now described with reference to FIG. 7.

The light source unit 6 in the sixth embodiment includes the concave lens 11 and the housing 9 similarly to the first embodiment. In the sixth embodiment, a rectifying portion 170 included in a light source device 66 is different from the rectifying portion 100 included in the light source device 61 in the first embodiment. In the sixth embodiment, no support portion such as the support member 110 in the first embodiment is used. The rectifying portion 170 in the sixth embodiment is disposed between the one sealing portion 82 and the reflector 70 similarly to the rectifying portion 100 in the first embodiment and performs operation similar to that of the rectifying portion 100 in the first embodiment.

In the sixth embodiment, the rectifying portion 170 includes a disk-shaped rectifying portion main body 171 having a curved surface. An opening 171a is further formed at the center of the rectifying portion main body 171. The rectifying portion 170 is produced by inserting the sealing portion 82 of the arc tube 80 through the opening 171a such that the rectifying portion 170 can be positioned in a direction substantially orthogonal to the illumination axis L. Then, the rectifying portion 170 is fixed to the sealing portion 82 by filling the clearance between the opening 171a and the sealing portion 82 with the inorganic adhesive C such as cement. In this embodiment, a substantially constant clearance is produced between an outer circumferential end 171b of the rectifying portion 170 and the opposed reflection layer 73 in this condition. Anti-reflection processing is applied to the surface of the rectifying portion 170 similarly to the first embodiment, and the material constituting the rectifying portion 170 is similar to that of the rectifying portion 100 in the first embodiment.

The flow of cooling air W6 (indicated by broken lines with arrows) introduced through the air intake port 9a to a space C6 of the light source unit 6 by operation of the cooling mechanism 500 is now explained. The flow of the cooling air W6 in this embodiment is substantially similar to the flow of the cooling air W2 in the second embodiment. Thus, only the point different from the second embodiment is herein described.

The different point is that most of the cooling air W6 introduced to the space C6 of the housing 9 smoothly flows in the direction along the curved surface of the rectifying portion 170 (−Z direction). A part of the cooling air W6 flows to the space D6 surrounded by the reflector 70 and the rectifying portion 170 through the clearance between the outer circumferential end 171b of the rectifying portion 170 positioned in the +Z direction and the reflection layer 73. The cooling air W6 immediately before the air discharge port 9b also smoothly flows along the curved surface of the rectifying portion 170. The regulation of the flow direction of the cooling air W6 by the rectifying portion 170 and the operation of the regulated cooling air W6 are substantially similar to those in the second embodiment.

The light source unit 6 according to the sixth embodiment has structure similar to that of the light source unit 1 (the light source device 61) in the first embodiment except for that no support portion is included and that different structure and fixing method of the rectifying portion 170 of the light source device 66 are used. Thus, the following advantages as well as the corresponding ones of the advantages of the light source device 61 in the first embodiment are provided.

(1) According to the light source device 66 in the sixth embodiment, the rectifying portion 170 is directly fixed to the sealing portion 82. Thus, the structure can be simplified, and the manufacturing cost of the light source device 66 can be reduced.

(2) According to the light source device 66 in the sixth embodiment, the rectifying portion 170 has a curved surface. In this case, the flow direction of the cooling air W6 can be regulated while the cooling air W6 is smoothly flowing along the curved surface. Thus, the flow of the cooling air W6 can be easily controlled.

(3) According to the light source device 66 in the sixth embodiment, the rectifying portion 170 has a curved surface. On the other hand, each of the rectifying portions 100, 120, 130, 150, and 160 has a flat surface. Thus, highly efficient surfaces of the rectifying portion suited for the respective shapes of the arc tube, the reflector and the like included in the light source device and for the respective ways of flow of the cooling air can be selected with a higher degree of freedom.

Seventh Embodiment

Figure 8:
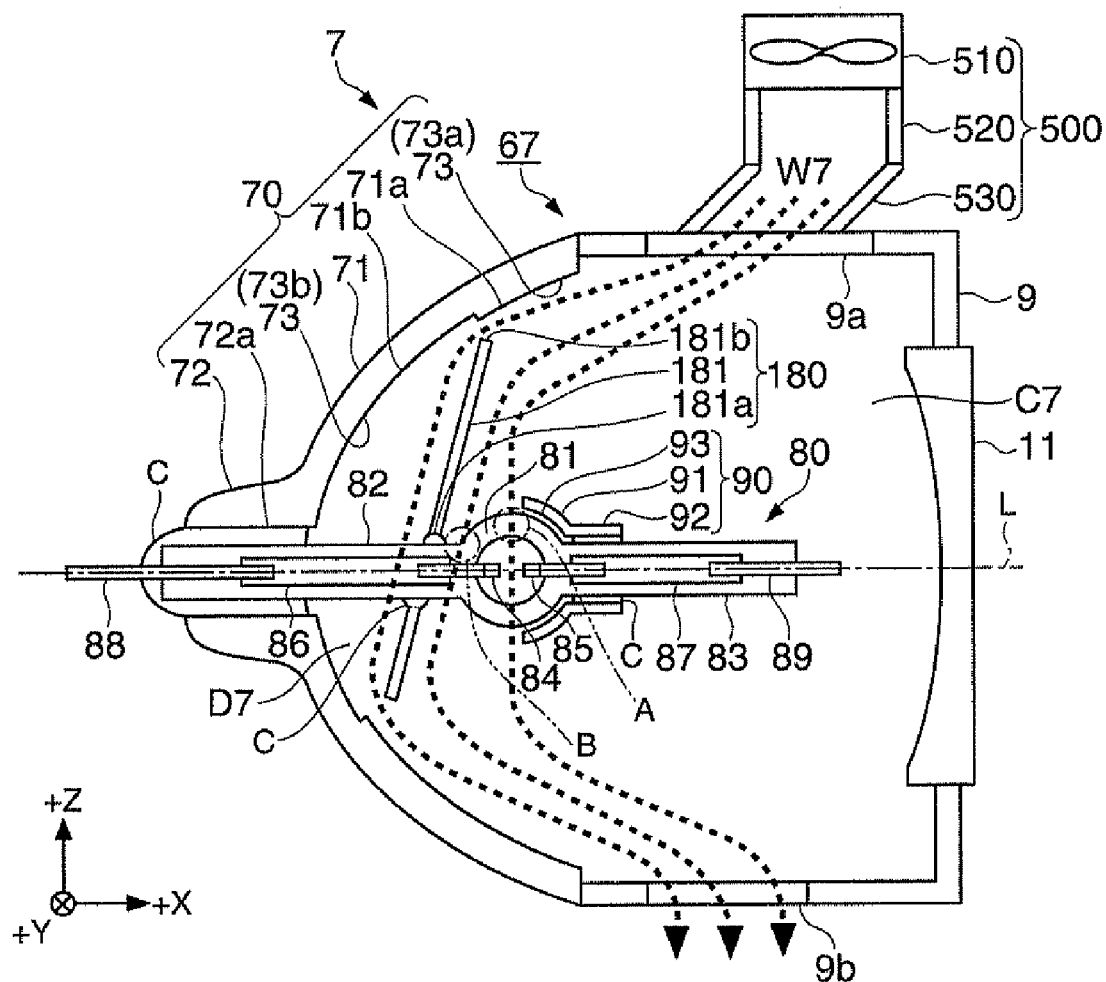
FIG. 8 is a cross-sectional view illustrating the side of a light source unit according to a seventh embodiment.
Figure 9:
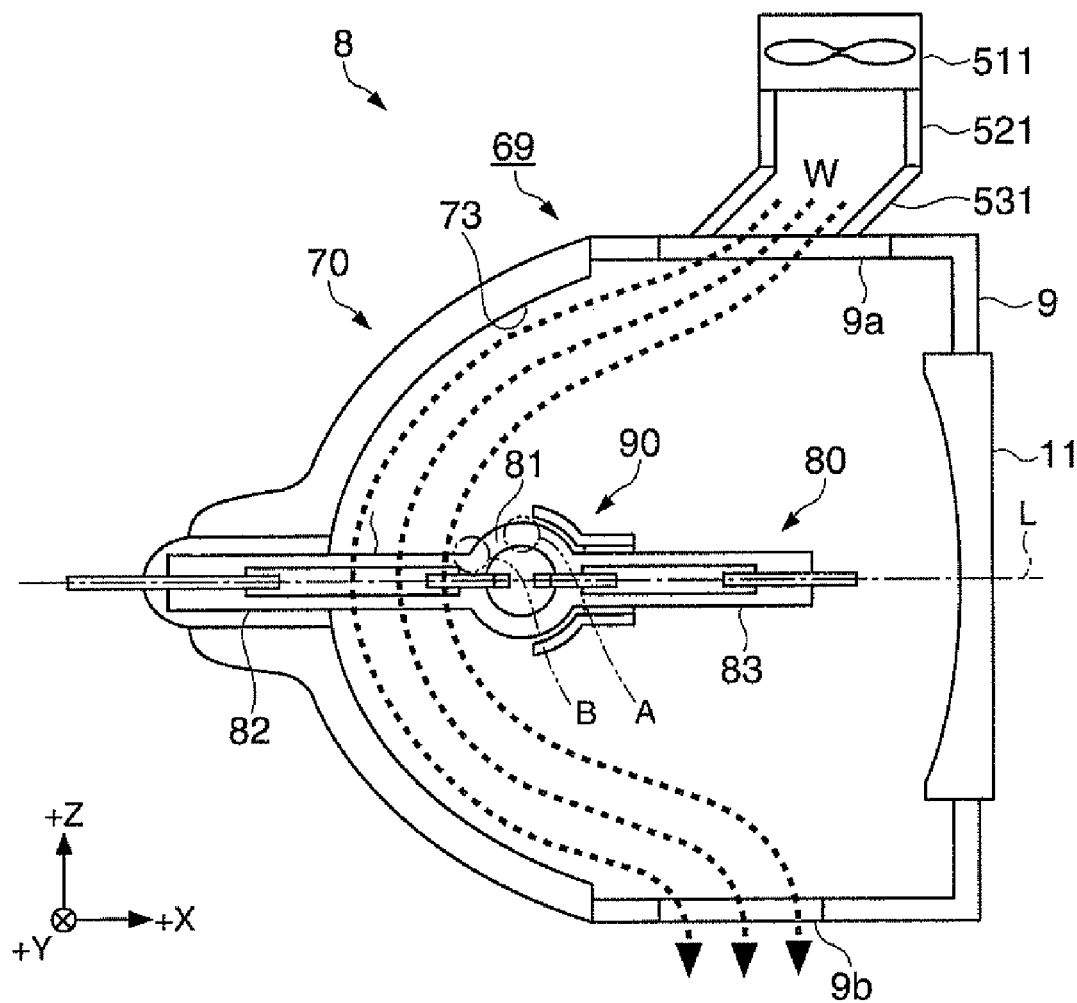
FIG. 9 is a cross-sectional view illustrating the side of a light source unit including a light source device in related art.

FIG. 8 is a cross-sectional view illustrating the side of a light source unit according to a seventh embodiment. In FIG. 8, similar reference numbers are given to parts similar to those in the first embodiment, and the same explanation is not repeated herein. The XYZ orthogonal coordinate system shown in FIG. 8 is similar to the XYZ orthogonal coordinate system shown in FIG. 1 and used in the first embodiment. The projector 600 in the seventh embodiment is similar to the projector 600 in the first embodiment except for the point that a light source unit 7 is included in lieu of the light source unit 1 in the optical systems of the projector 600 in the first embodiment.

The structure and operation of the light source unit 7 in the seventh embodiment are now described with reference to FIG. 8.

The light source unit 7 in the seventh embodiment includes the concave lens 11 and the housing 9 similarly to the first embodiment. In the seventh embodiment, a rectifying portion 180 included in a light source device 67 is different from the rectifying portion 100 included in the light source device 61 in the first embodiment. In the seventh embodiment, no support portion such as the support member 110 in the first embodiment is used. The rectifying portion 180 in the seventh embodiment is disposed between the one sealing portion 82 and the reflector 70 similarly to the rectifying portion 100 in the first embodiment and performs operation similar to that of the rectifying portion 100 in the first embodiment.

In the seventh embodiment, the rectifying portion 180 includes a disk-shaped rectifying portion main body 181 having a flat surface. An opening 181a is further formed at a position shifted from the center of the rectifying portion main body 181. The rectifying portion 180 is produced by inserting the sealing portion of the arc tube 80 through the opening 181a with inclination to the illumination axis L at a predetermined angle. Then, the rectifying portion 180 is fixed to the sealing portion 82 by filling the clearance between the opening 181a and the sealing portion 82 with the inorganic adhesive C such as cement. In this embodiment, the rectifying portion 180 is fixed with inclination to the illumination axis L at the predetermined angle. More specifically, the rectifying portion 180 in the +Z direction is fixed with inclination toward the light emission portion 81.

In this embodiment, a substantially constant clearance is produced between an outer circumferential end 181b of the rectifying portion 180 and the opposed reflection layer 73. Anti-reflection processing is applied to the surface of the rectifying portion 180 similarly to the first embodiment, and the material constituting the rectifying portion 180 is similar to that of the rectifying portion 100 in the first embodiment.

The flow of cooling air W7 (indicated by broken lines with arrows) introduced through the air intake port 9a to a space C7 of the light source unit 7 by operation of the cooling mechanism 500 is now explained. The flow of the cooling air W7 in this embodiment is substantially similar to the flow of the cooling air W2 in the second embodiment. Thus, only the point different from the second embodiment is herein described.

The different point is that most of the cooling air W7 introduced to the space C7 of the housing 9 smoothly flows in the direction along the inclined flat surface of the rectifying portion 180 (−Z direction). A part of the cooling air W7 flows to a space D7 surrounded by the reflector 70 and the rectifying portion 180 through the clearance between the outer circumferential end 181b of the rectifying portion 180 positioned in the +Z direction and the reflection layer 73. The regulation of the flow direction of the cooling air W7 by the rectifying portion 180 and the operation of the regulated cooling air W7 are substantially similar to those in the second embodiment.

The light source unit 7 according to the seventh embodiment has structure similar to that of the light source unit 1 (the light source device 61) in the first embodiment except for that no support portion is included and that different structure and fixing method of the rectifying portion 180 of the light source device 67 are used. Thus, the following advantages as well as the corresponding ones of the advantages of the light source device 61 in the first embodiment are provided.

(1) According to the light source device 67 in the seventh embodiment, the rectifying portion 180 is directly fixed to the sealing portion 82. Thus, the structure can be simplified, and the manufacturing cost of the light source device 67 can be reduced.

(2) According to the light source device 67 in the seventh embodiment, the rectifying portion 180 has a flat surface and is fixed not in the direction orthogonal to the illumination axis L but with inclination thereto. In this case, the flow direction of the cooling air W7 can be regulated while the cooling air W7 is smoothly flowing along the inclined flat surface. Thus, the flow of the cooling air W7 can be easily controlled.

The invention is not limited to the first through seventh embodiments described herein, but may be practiced otherwise without departing from the scope and spirit of the invention. As such, various changes and improvements including the following modifications may be made.

Modified Example 1

While each of the light source devices 61 through 67 in the first through seventh embodiments includes the sub mirror 90, the invention is applicable to a light source device not having the sub mirror 90.

Modified Example 2

According to the light source devices 61 through in the first through seventh embodiments, the rectifying portions 100, 120, 130, 150, 160, 170, and 180, the support members 110 and 140, and others are provided. However, the shapes of the rectifying portions and the support members, the fixing structures and the like may be arbitrarily changed or combined without departing from the scope of the invention.

Modified Example 3

According to the light source devices 61, 64, 66, and 67 in the first, fourth, sixth, and seventh embodiments, the rectifying portions 100, 150, 170, and 180 are fixed to the sealing portion 82 by the inorganic adhesive C as an adhesive. In this case, the rectifying portion may be fixed to the sealing portion 82 by the adhesive at a position corresponding to an area out of the region where lines included in the electrode 84 are connected by welding or the like with the metal foil 86 sealed within the one sealing portion 82 (electrode connection region). When the rectifying portion is fixed by the adhesive in this manner, the effect caused by thermal stress can be reduced by avoiding the electrode connection region of the sealing portion 82 as an area easily affected by the effect of thermal stress.

Modified Example 4

According to the light source devices 61 through 65, and 67 in the first through fifth embodiments and the seventh embodiment, the rectifying portions 100, 120, 130, 150, 160, and 180 have flat surfaces. According to the light source device 66 in the sixth embodiment, however, the rectifying portion 170 has a curved surface. Thus, a highly efficient surface of the rectifying portion suited for the shapes of the arc tube, the reflector and the like included in the light source device and for the way of flow of the cooling air different from those in the first through seventh embodiments can be selected for producing the rectifying portion.

Modified Example 5

According to the first embodiment, the rectifying portion 100 and the support member 110 are separately produced, and then combined as one unit. However, the rectifying portion 100 and the support member 110 may be formed integrally with each other from the beginning.

Modified Example 6

According to the second embodiment, the rectifying portion 120 has the notches 122 on the edge. However, the shapes of the notches 122 may be changed such that effective cooling can be provided based on the consideration of the heat distribution inside the light source device 62, the way of flow of the cooling air W2, and other conditions.

Modified Example 7

While each of the projectors 600 according to the first through seventh embodiments includes the lens integrator optical system containing the first lens array 12 and the second lens array 13 as the optical system for equalizing the illuminance of emitted light, a rod integrator optical system containing a light guide rod may be used.

Modified Example 8

While each of the projectors 600 according to the first through seventh embodiments is a front type projector, the invention is applicable to a rear type projector including a screen as a projection target surface in one unit.

Modified Example 9

According to the optical systems of the projectors 600 in the first through seventh embodiments, the liquid crystal devices 30R, 30G, 30B as the optical modulation devices are transmission type liquid crystal devices. However, reflection type optical modulation devices such as reflection type liquid crystal devices may be used.

Modified Example 10

According to the optical systems of the projectors 600 in the first through seventh embodiments, the liquid crystal devices 30R, 30G, 30B as the optical modulation devices are used. However, any type of optical modulation device may be employed as long as they can generally modulate entering light according to image signals. For example, micromirror type optical modulation devices may be used. The micromirror type optical modulation devices may be constituted by a DMD (digital micromirror device).

Modified Example 11

According to the optical systems of the projectors 600 in the first through seventh embodiments, the optical modulation devices are those of so-called three-plate type which includes the three liquid crystal devices 30R, 30G, and 30B in correspondence with the red light, green light, and blue light. However, single-plate type may be employed. Moreover, a liquid crystal device for improving contrast may be added.

The present application claims priority from Japanese Patent Application No. 2009-057512 filed on Mar. 11, 2009, which is hereby incorporated by reference in its entirety.

What is claimed is:

1. A light source device, comprising:
an arc tube that includes (1) a light emission portion containing a pair of electrodes disposed along an illumination axis, and (2) a pair of sealing portions extending from both sides of the light emission portion;
a reflector that includes a reflection portion disposed in the vicinity of one of the sealing portions (the first sealing portion) of the arc tube that reflects light emitted from the arc tube toward an illumination area; and
a rectifying portion disposed between the light emission portion and the reflection portion of the reflector that regulates a flow direction of cooling air and transmits the light directly from the reflector out of the light source device.

2. The light source device according to claim 1, further comprising:
a sub mirror disposed in the vicinity of the other one of the sealing portions (the second sealing portion) in such a manner as to cover the outer surface of the light emission portion as the surface facing the illumination area to reflect the light from the arc tube toward the arc tube.

3. The light source device according to claim 1, wherein the rectifying portion is fixed to at least one member selected from the group consisting of the first sealing portion and the reflector.

4. The light source device according to claim 1, further comprising:
a support portion that supports the rectifying portion in the vicinity of the first sealing portion and fixes the rectifying portion to a position around the first sealing portion.

5. The light source device according to claim 4, wherein the support portion holds the rectifying portion between the support portion and the light emission portion and fixes the rectifying portion.

6. The light source device according to claim 1, wherein a notch is formed on the edge of the rectifying portion.

7. The light source device according to claim 1, wherein: when an adhesive is used for fixing the rectifying portion to the first sealing portion, the adhesive fixes the rectifying portion to a position corresponding to an area out of an electrode connection region of the first sealing portion.

8. The light source device according to claim 1, wherein the rectifying portion is disposed in such a position such that a diameter of the rectifying portion is substantially orthogonal to the illumination axis, and has a flat surface or a curved surface through which the light can be transmitted and a substantially circular or substantially rectangular flat shape.

9. The light source device according to claim 1, wherein an anti-reflection processing is applied to the surface of the rectifying portion.

10. The light source device according to claim 1, wherein:
the reflector further includes a first concave surface and a second concave surface;
the first concave surface of the reflector has a first reflection layer which receives light transmitted through the rectifying portion; and
the second concave surface of the reflector has a second reflection layer which receives light not transmitted through the rectifying portion.

11. A projector, comprising:
an arc tube that includes (1) a light emission portion containing a pair of electrodes disposed along an illumination axis, and (2) a pair of sealing portions extending from both sides of the light emission portion;
a reflector that includes a reflection portion disposed in the vicinity of one of the sealing portions (the first sealing portion) of the arc tube that reflects light emitted from the arc tube toward an illumination area; and
a rectifying portion disposed between the light emission portion and the reflection portion of the reflector that regulates a flow direction of cooling air and transmits the light directly from the reflector out of the light source device; and
an optical modulation device which forms an optical image by modulating light emitted from the light source device.

12. The projector according to claim 11, further comprising:
the sub mirror disposed in the vicinity of the other one of the sealing portions (the second sealing portion) in such a manner as to cover the outer surface of the light emission portion as the surface facing the illumination area to reflect the light from the arc tube toward the arc tube.

13. The projector according to claim 11, wherein the rectifying portion is fixed to at least one member selected from the group consisting of the first sealing portion and the reflector.

14. The projector according to claim 11, further comprising:
the support portion that supports the rectifying portion in the vicinity of the first sealing portion and fixes the rectifying portion to a position around the first sealing portion.

15. The projector according to claim 14, wherein the support portion holds the rectifying portion between the support portion and the light emission portion and fixes the rectifying portion.

16. The projector according to claim 11, wherein a notch is formed on the edge of the rectifying portion.

17. The projector according to claim 11, wherein: when an adhesive is used for fixing the rectifying portion to the first sealing portion, the adhesive fixes the rectifying portion to a position corresponding to an area out of an electrode connection region of the first sealing portion.

18. The projector according to claim 11, wherein the rectifying portion is disposed in such a position such that a diameter of the rectifying portion is substantially orthogonal to the illumination axis, and has a flat surface or a curved surface through which the light can be transmitted and a substantially circular or substantially rectangular flat shape.

19. The projector according to claim 11, wherein the anti-reflection processing is applied to the surface of the rectifying portion.

20. The projector according to claim 11, wherein:
the reflector further includes a first concave surface and a second concave surface;
the first concave surface of the reflector has a first reflection layer which receives light transmitted through the rectifying portion; and
the second concave surface of the reflector has a second reflection layer which receives light not transmitted through the rectifying portion.

* * * * *